United States Patent [19]
Sone

[11] Patent Number: 6,088,318
[45] Date of Patent: Jul. 11, 2000

[54] COMPACT DISC PLAYER AND A COMPACT DISC

[75] Inventor: Takurou Sone, Hamamatsu, Japan

[73] Assignee: Yamaha Corporation, Hamamatsu, Japan

[21] Appl. No.: 09/362,339

[22] Filed: Aug. 26, 1994

Related U.S. Application Data

[63] Continuation of application No. 07/872,439, Apr. 23, 1992, abandoned.

[30]     Foreign Application Priority Data

Apr. 26, 1991 [JP] Japan .................................... 3-124965
May 2, 1991 [JP] Japan .................................... 3-130489

[51] Int. Cl.⁷ ...................................................... G11B 7/00

[52] U.S. Cl. ................................ 369/58; 369/59; 369/48

[58] Field of Search ................................. 369/47, 48, 49, 369/50, 54, 58, 59, 60, 32; 360/48, 51, 53

[56]     References Cited

U.S. PATENT DOCUMENTS

| | | | |
|---|---|---|---|
| 4,939,595 | 7/1990 | Yoshimoto et al. | 360/19.1 |
| 5,063,551 | 11/1991 | Yoshio et al. | 369/48 |
| 5,157,643 | 10/1992 | Suzuki | 369/32 |

*Primary Examiner*—Muhammad Edun
*Attorney, Agent, or Firm*—Pillsbury Madison & Sutro LLP

[57]     ABSTRACT

A Compact Disc player having a display device includes a reproducing circuit for reading out digital data which includes digital audio data and specific information recorded on a Compact Disc, a specific information identifying circuit for identifying both character code information and modifying information from the specific information, a character decoder for decoding the identified character code information to character information on the basis of code converting information such as ASCII character code information, and a modifying circuit for modifying the decoded character information on the basis of the identified modifying information. Thus, the Compact Disc player can display the character information modified by the modifying information on the display device. The Compact Disc player is also capable of displaying image information on the basis of image contour co-ordinates data recorded in a subcoding area of a Compact Disc.

20 Claims, 16 Drawing Sheets

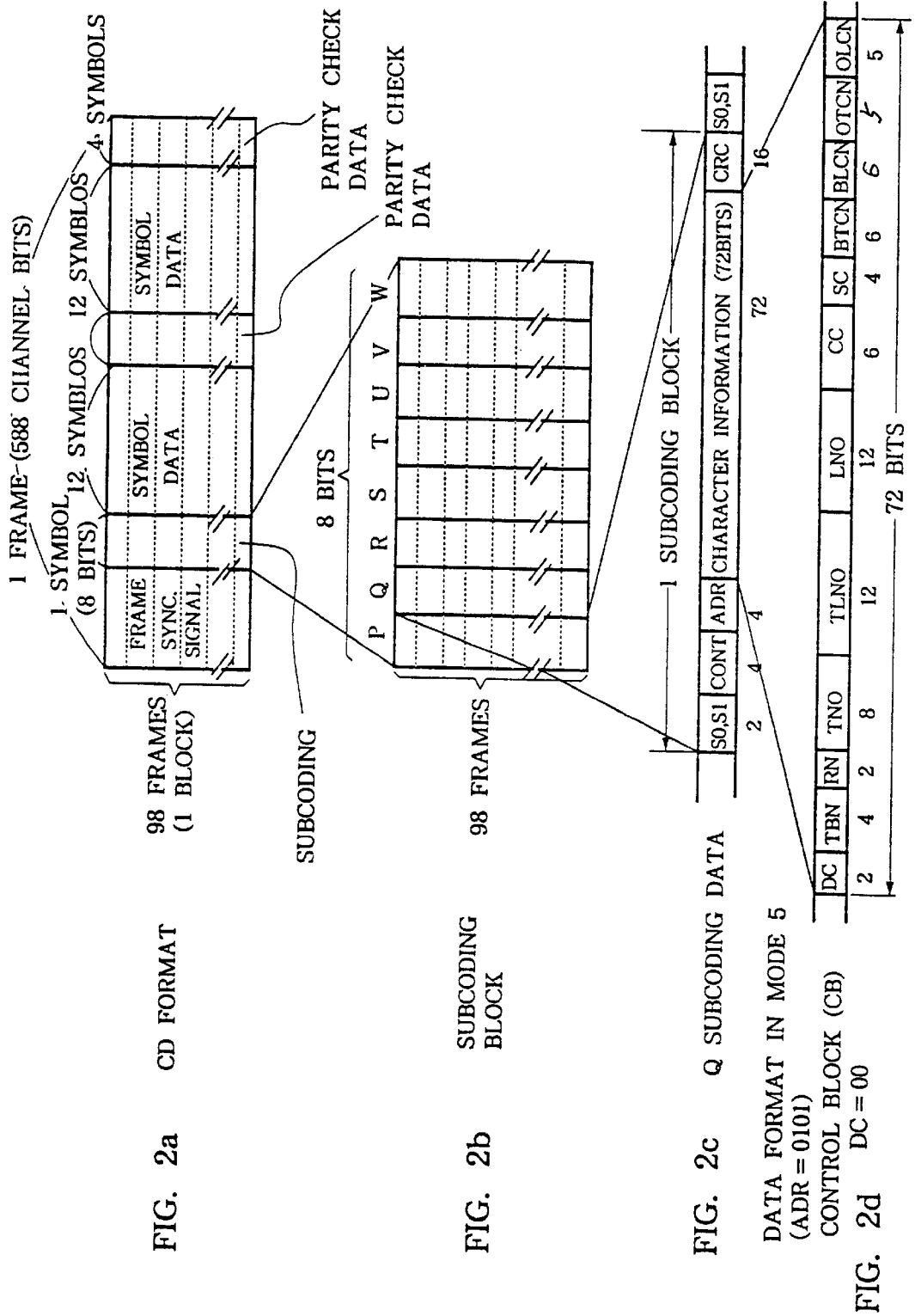

BASIC CHARACTER BLOCK (BC)
DC = 10

OPTIONAL CHARACTER BLOCK (OC)
DC = 11
CC = 000001 (CHINESE CHARACTER)

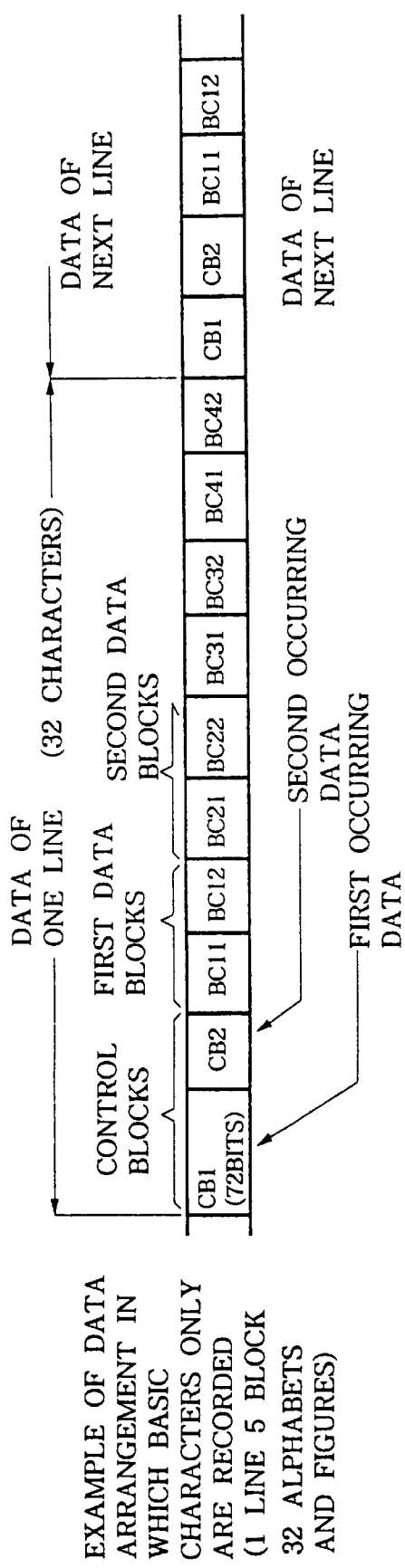
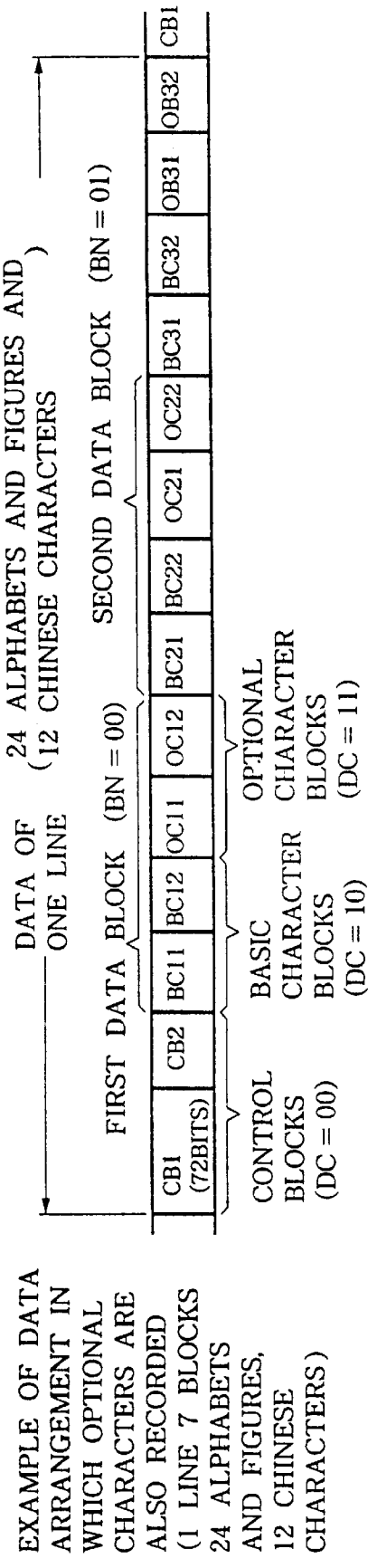

GENERAL FORM OF
DATA TRAIN OF
ESCAPE SEQUENCE
INSERTED IN
CHARACTER CODE
DATA OF Q-SUBCODING
OF MODE 5

DISPLAY POSITION

DISPLAYED COLOR

CHARACTER SIZE

CHARACTER DECORATION

CHARACTER ANGLE

CHARACTER TRAIN
ANGLE

CHARACTER ANGLE

CHARACTER TRAIN ANGLE

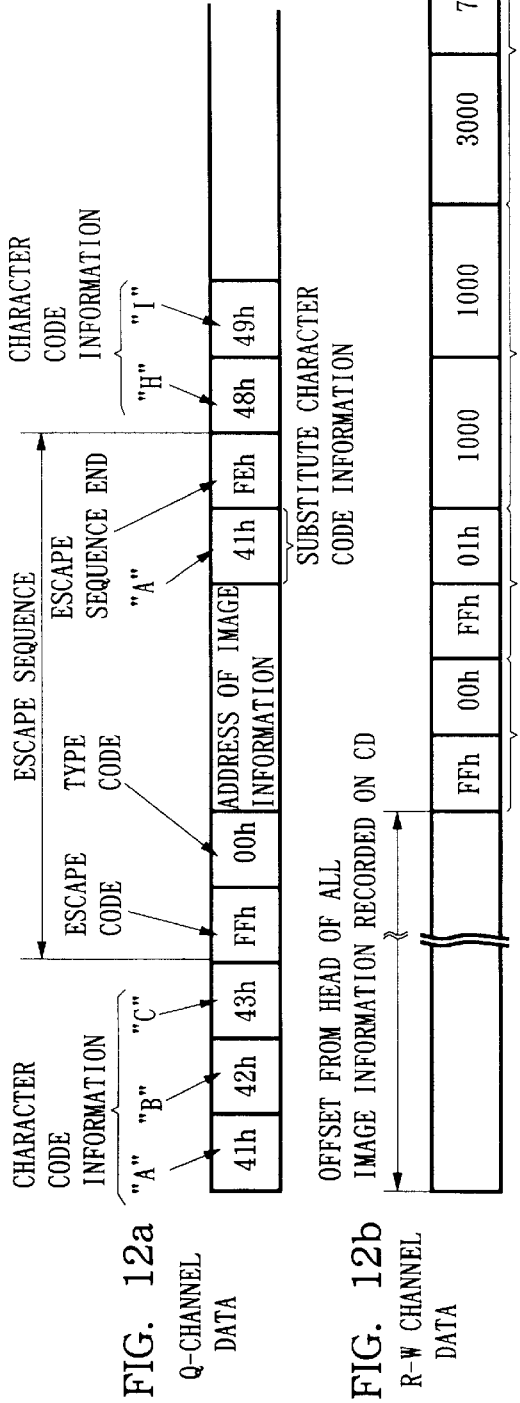
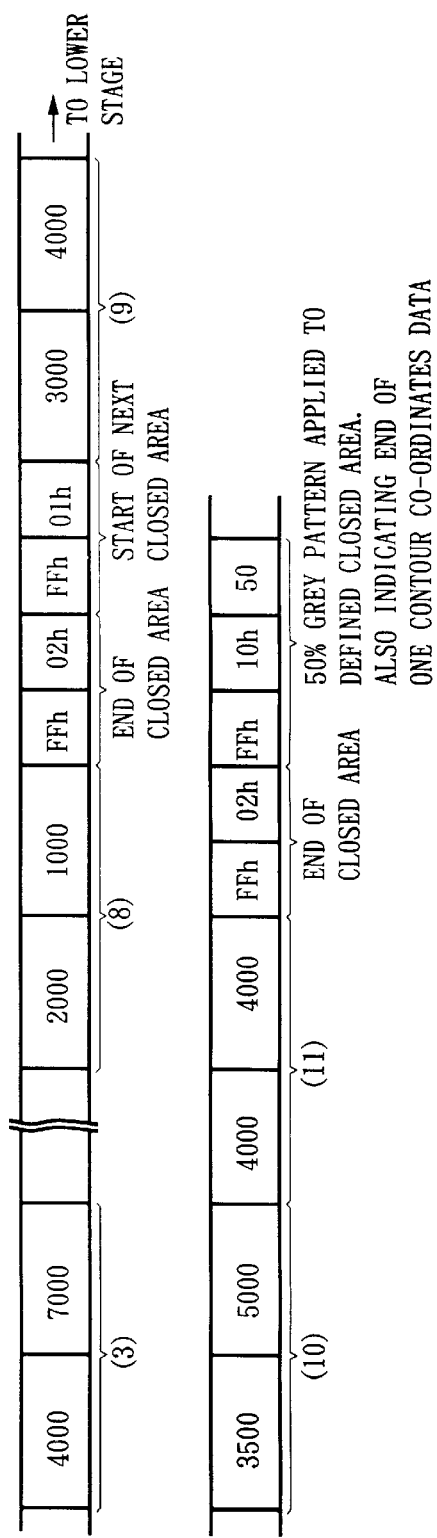
FIG. 12a Q-CHANNEL DATA
FIG. 12b R-W CHANNEL DATA

Q-CHANNEL DATA OF TYPE 1: FFh | 01h | ADDRESS OF IMAGE INFORMATION | X | Y | SUBSTITUTING CHARACTER TRAIN | FEh

{ X, Y } = DISPLAY POSITION

FIG. 16

Q-CHANNEL DATA OF TYPE 2: FFh | 02h | ADDRESS OF IMAGE INFORMATION | ATR | SUBSTITUTING CHARACTER TRAIN | FEh

ATR = ATTRIBUTE INFORMATION

FIG. 17

Q-CHANNEL DATA OF TYPE 3: FFh | 03h | ADDRESS OF IMAGE INFORMATION | X | Y | ATR | SUBSTITUTING CHARACTER TRAIN | FEh

{ X, Y } = DISPLAY POSITION; ATR = ATTRIBUTE INFORMATION

COMPACT DISC PLAYER AND A COMPACT DISC

This is a continuation of application Ser. No. 07/872,439, filed Apr. 23, 1992, now abandoned.

BACKGROUND OF THE INVENTION

This invention relates to a Compact Disc player capable of displaying character information and, optionally image information in addition thereto, concerning contents of a music such as the title, name of the composer or performer. The Compact Disc player realizes mofifying of a displayed character based on the character information. The Compact Disc player also provides a high quality display of of an image in conformity with an image displaying ability of a display unit. The invention relates further to a Compact Disc in which modifying information for modifying character information is recorded and also to a Compact Disc in which image information enabling such high quality display of an image is recorded.

In a conventional Compact Disc player, various displays are made based on data reproduced from a Compact Disc for conveniences for use of a Compact Disc.

As displays in the conventional Compact Disc player based on reproduced data from the disc, there are TNO (track number and music program number) display and TIME (reproducing time) display which are made directly based on data recorded in a Q-channel subcoding of the Compact Disc in the state of "mode 1".

Characters displayed on the basis of data recorded in the Q-channel subcoding in the conventional display device are of a low quality because they are uniform and poor in the power of expression.

It is, therefore, a first object of the invention to provide a Compact Disc player capable of improving the quality of displayed characters by modifying character code information.

For solving this problem and enabling display of various patterns by image information in addition to the display of character code information, there is an invention by the same assignee of this application which is described in the specification of U.S. patent application Ser. No. 07/718,551. According to the proposed invention, image information is recorded in subcoding channels other than the Q-channel subcoding of a Compact Disc and this image information is reproduced and displayed. More specifically, image information consisting of bit map data is recorded in R to W channel subcodings of a Compact Disc.

As a display unit for displaying an image based on image information, an LCD (liquid crystal display), for example, may be employed. In this case, the size of the display unit is varied depending upon the size of the Compact Disc player. When the Compact Disc player has a display unit of a relatively large size, an image based on image information can be displayed in an enlarged scale. In the case of using the image information based on the above described bit map, however, ruggedness of the image contour becomes conspicuous as a result of the enlarged display of the image with resulting deterioration in the quality of display.

It is, therefore, a second object of the invention to provide a Compact Disc player and a Compact Disc capable of displaying an image in high quality regardless of the size of display of the image.

SUMMARY OF THE INVENTION

A display device for a Compact Disc player achieving the first object of the invention comprises reproducing means for reading out digital data recorded on a Compact Disc, the digital data including digital audio data and specific information, specific information identifying means for identifying specific information from digital data read out by said reproducing means, the specific information having character code information and modifying information, the specific information identifying means comprising converting means for converting the character code information into character information, and modifying means for modifying character information converted by said converting means on the basis of the modifying information, and display means for displaying character information modified by said modifying means.

A Compact Disc achieving the object of the invention is one wherein character code information and modifying information for modifying a displayed character based on the character code information are recorded in a subcoding frame of a Compact Disc.

A Compact Disc player achieving the second object of the invention comprises image data reproducing means for reading out image contour co-ordinates data recorded in a subcoding region of a Compact Disc, the image contour co-ordinates data being for forming a contour of desired image information, image information producing means for producing bit map data on the basis of image contour co-ordinates data from said image data reproducing means, and display means for displaying image information corresponding to bit map data produced by said image information producing means.

A Compact Disc according to this aspect of the invention is one wherein image information in the farm of image contour co-ordinates data is recorded on subcoding channels of a Compact Disc.

According to this aspect of the invention, bit map data of an image is prepared on the basis of image contour co-ordinates data read from subcoding channels and this bit map data is displayed. Accordingly, an image display of a high quality can be achieved regardless of the size of the display unit.

Preferred embodiments of the invention will be made below with reference to the accompanying drawings.

BRIEF DESCRIPTION OF THE DRAWINGS

In the accompanying drawings,

FIGS. 2a to 2f are diagrams showing an example of a Compact Disc data format used in the invention;

FIG. 3 is a diagram showing an example of data for one line (in the case of the basic character only) according to the invention;

FIG. 4 is a diagram showing an example of data for one line (in the case of the optional character only) according to the invention;

FIGS. 12a and 12b are diagrams showing an example each of escape sequence of Q-channel subcoding in which image control information is included and a format of R to W channel subcodings in which image information is included;

FIGS. 14a and 14b are diagrams showing an example of display by the information of FIGS. 6a and 6b;

FIG. 15 is a diagram showing a type of escape sequence in the Q-channel subcoding;

FIG. 16 is a diagram showing another type of escape sequence in the Q-channel subcoding;

FIG. 17 is a diagram showing still another type of escape sequence in the Q-channel subcoding;

DESCRIPTION OF PREFERRED EMBODIMENTS

An embodiment of the invention will now be described. Description will be made about a case where modification of a character is made by applying the invention to a display of information concerning contents of a music such as a disc title, music title, composer's name etc. by using character code information of Q-subcoding which is newly defined as Mode 5 in the applicant's copending U.S. patent application Ser. No. 07/718,551. In this embodiment, modifying information is inserted in the form of an escape sequence in a character code train to apply modification of a display by the character code information.

Figure 2E:
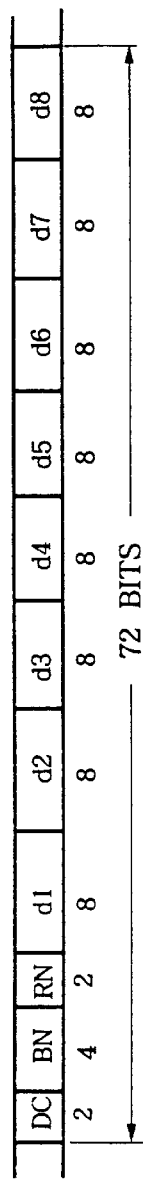

An example of a Compact Disc data format used in the present invention will be described. FIGS. 2a–2f show an outline of data format of a Compact Disc to which the invention is applied. In this data format, one frame consists of 588 channel bits as shown in FIG. 2a, each frame having a subcoding area of one symbol (8 bits). The subcoding is constructed so that it is completed with 98 frames and includes, as shown in FIG. 2b, eight channels P, Q, . . . W, each channel consisting of 98 bits.

The Q-channel is constructed as shown in FIG. 2c. The mode is designated by ADR (address) in Q-channel subcoding. Mode 1 (ADR=0001), Mode 2 (ADR=0010) and Mode 3 (ADR=0011) have already been defined in the conventional Compact Disc data format. In this example, Mode 5 (0101) is newly defined as the character display mode in the present invention. By restricting the rate of appearance of the Mode 5 to entire modes to at most 8/100, reproduction of the already defined Modes 1 to 3 can be performed without any trouble.

Figure 2F:
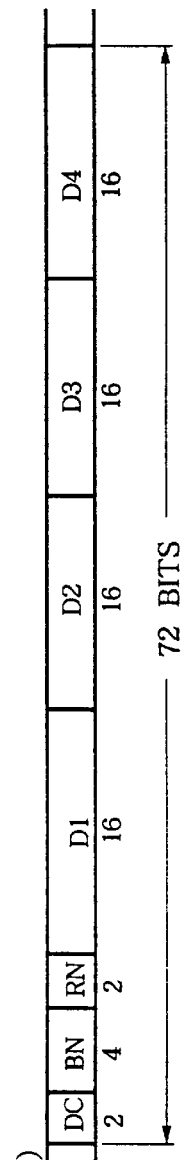

Contents of data blocks (each 72 bits) in the Mode 5 are shown in FIGS. 2d–2f. Data signals (specific information) in the Mode 5 consist of three types of data blocks shown in FIGS. 2d–2f. These blocks are classified into the following blocks depending upon the initial two bits (DC):

DC: Data Contents (indicating contents of the recorded block)

| | | |
|---|---|---|
| DC = 00: | CB: | Control Block (i.e., editing information) indicating that this data block consists of control data used for display of characters |
| DC = 01: | BC: | Basic Character Block (i.e., character code information (ASCII) indicating that this data block consists 8-bit ASCII alphabetic character and figure codes used as the basic characters |
| DC = 11: | OC: | Optional Character Block (i.e., character code information (e.g., JIS Chinese characters)) indicating that this data block consists of e.g., 16-bit JIS Chinese character codes used as the optional characters |

JIS is the abbreviation for Japanese Industrial Standard.

Data formats in the respective data blocks will now be described.

(1) Data Format in the Control Block CB (FIG. 2(d))

i) TBN: Total Block Number (4 bits)

This data indicates the number of blocks constituting one character line (one block consisting of 8 characters in the case of the basic characters and 4 characters in the case of the optional characters). The number of the control block is not counted.

| |
|---|
| 0001: 1 block |
| : : |
| 0010: 2 blocks |
| 1111: 15 blocks | ii) RN: Repeat Number (2 bits)

This data indicates whether the character code data is the first occurring one or second occurring one of data written twice for preventing reading error.

| |
|---|
| 01: first occurring data |
| 10: second occurring data | iii) TNO: Track Number (8 bits)

This data indicates the music program number of the displayed music program. This data only is constructed of the BCD code. This TNO basically coincides with TNO of Mode 1. In a case, however, where, as will be described later, music program number information of a succeeding music program is inserted before the preceding music program is over, an arrangement is made so that the display of the music program number will be started from a time point when TNO in the Mode 1 coincides with TNO in the Mode 5.

0000 0000: The character line on which this TNO is recorded indicates that the displayed data is one which is common through all music programs contained in the disc such as the disc title and the name of the singer and can be displayed any time.

```
0000 0001: first music program
     :     Data for corresponding
            music program
1001 1001: 99-th music program
1111 1111: This data is used when the characters
           are to be displayed in real time while
           the data is read by the Compact Disc
           player (e.g., words of a "karaoke"
           (sing-along machine))
``` iv) TLNO: Total Line Number (12 bits)

This data indicates the number of lines of character lines recorded for the particular music program.

```
0000 0000 0000: No character is recorded.
0000 0000 0001: one line
     :              :
1111 1111 1111: 40 95 lines
``` v) CC: Character Code (6 bits)

This data indicates a decode code for the optional characters (e.g., Chinese characters).

```
00 0000: The data consists of the basic character
         blocks only and no optional character is
         recorded.
00 0001: Chinese characters are recorded as the
         optional characters.
00 0010: Not allotted yet. Depending upon the
    :    character code established, a block of
    :    characters of 8-bit unit which is the same
    :    as the basic character block is
    :    conceivable (e.g., Japanese Hiragana or
11 1111: Katakana character or other characters).
``` vi) SC: Select Code (4 bits)

This data is a classifying code indicating contents of data on the displayed character line.

```
0000: Title of the disc
0001: Title of the displayed music program
0010: Name of the composer
0011: Name of the writer of the song
0100: Name of the arranger
0101: Name of the conductor
0110: Name of the main vocal
0111: Name of orchestra
1000: Hall where the music is performed
1010: Mixer
  :
1111:
``` vii) BTCN: Basic Total Character Number (6 bits)

This data indicates the number of characters included in the character line (basic character line). By using this data, the characters can be displayed in a well-balanced arrangement on the display.

```
00 0000: one character
     :         :
11 1111: 63 characters
``` viii) BLCN: Basic Line Change Number (6 bits)

This data indicates a character position at which a new line should be made in the displayed character line, that is, the starting position of a character at which a new line may be made which is indicated, by the number counted from the first character. By using this data, character information can be displayed in a well-balanced arrangement even in a case where the number of digits of the display of the Compact Disc player is smaller than the number of characters of one line which can be displayed, so that selection of a display in the Compact Disc player can be made with a greater degree of freedom.

```
00 0000: A new line may be made at any character.
00 0010: A new line may be made at the second
         character.
00 0011: A new line may be made at the third
         character.
    :         :
11 1111: A new line may be made at the sixty-third
         character.
``` ix) OTCN: Optional Total Character Number (5 bits)

This data indicates the number of characters included in the character line of the optional characters (optional character line).

```
0 0000: There is no optional character.
0 0001: 1 character
   :         :
1 1111: 31 characters
``` x) OLCN: Optional Line Change Number (5 bits)

This data indicates a character at which a new line be made in the displayed optional character line, the starting position of a character at which a new line may be made which is indicated by the number continued from the first character.

```
0 0000: A new line may be made at any character.
0 0010: A new line may be made at the second
        character.
0 0011: A new line may be made at the third
        character.
   :         :
1 1111: A new line may be made at the 31st
        character.
```

(2) Data Format in the Basic Character Block BC (FIG. 2e)

i) BN: Block Number (4 bits)

This data indicates the order (position) of the particular block in one character line. The control block is not included in this order. A twice written block is counted as one block.

```
0001: first character block
0010: second block
  :         :
1111: fifteenth block
``` ii) RN: Repeat Number (2 bits)

(the same as RN in the control block)

iii) d1 to d8: alphabetic character and figure data according to ASCII code of 8 bits.

| | |
|---|---|
| 0000 0000 | alphabetic characters and figures |
| : : | according to ASCII code |
| 1111 1110 | |
| 1111 1111: | Non-operation. Display of characters is not made but a stand-by state is brought about in a portion where this data is recorded. This data is different from a space indication in that, when next data has arrived, the data is indicated after the preceding data without space. This data is not counted as the character number. This data is used as adjusting data when the number of characters in one line cannot be divided by the block number. The data is used also for adjusting timing of display such as when characters are displayed in real time. |

(3) Data Format in the Optional Character Block OC (FIG. 2f)

i) BN: Block Number (4 bits)

(the same as BN in the basic character block)

ii) RN: Repeat Number (2 bits)

(the same as RN in the basic character block)

iii) D1 to D4: Chinese character data according to JIS code of 16 bits

| | |
|---|---|
| 0000 0000 0000 0000 | JIS Chinese character code |
| : | |
| 1111 1111 1111 1110 | |
| 1111 1111 1111 1111: | This data performs the same function as the non-operation data in the basic character block. |

In the character display of Mode 5, the basic character block is always recorded so that display of at least alphabetic characters and figures can be made even in a low-cost Compact Disc player. Recording of the optional characters is made optionally. Thus, display matching the grade of the Compact Disc player can be achieved.

By constructing the respective data blocks in the above described manner, the following benefits can be derived:

(a) Modification of the current data format can be held at the minimum.

The invention can be achieved by merely adding the new Mode 5 to the Q-channel subcoding, so that there is a complete compatibility between the data format of the invention and the current Compact Disc data format. No problem will occur if the Compact Disc of the present invention is played back by a conventional Compact Disc player.

Since data of the data format of the present invention is recorded by using the Q-channel subcoding which is always inserted in the Compact Disc format, total amount of data satisfies all needs without waste. If display characters of an item such as "作曲者" was recorded in each of the three types of blocks by JIS Chinese character code, for example, 16×3=48 bits would be required for this purpose only. Since, according to the invention, the same purpose can be achieved by merely allotting the editing information SC "0010" of 4 bits in the control data, data efficiency as a whole is thereby improved and display can be made effectively with a minimum amount of data transmission. Further, the display of the invention can be achieved without increasing the speed of data eransmission so that the current standard can be used without modification.

(b) Since it is code information, by storing read data, it can be used for various functions including data retreaval.

(c) By designating the classifying code (i.e., Select Code SC in the control data) by operation of an input device by the user, data to be displayed can be selected on the side of the Compact Disc player.

An example of one character line data made of a combination of the above described three types of data blocks is shown in FIGS. 3 and 4. FIG. 3 shows data consisting of the basic characters only and FIG. 4 shows a case where the optional characters are additionally recorded. In FIGS. 3 and 4, each block consists of 72 bits and is made of either one of the three types of data blocks (FIGS. 2d, 2e and 2f). A series of line data is constructed by detecting and connecting data blocks (Q-channel subcoding data of Mode 5) which is dispersively inserted in the Q-channel subcoding at the rate of appearance of at most 8/100.

A control block is provided at the head of data for one line and is followed by character blocks. In each block, the same data is repeatedly recorded (twice in the present embodiment) for preventing reading error.

Upon completion of recording of data for one line, the select code SC in the control block is changed and data of different contents thereby is successively recorded. Upon completion of recording of a series of data once by sequential change of SC, SC is restored to the initial one and the same data is repeatedly recorded so long as the same music program continues. Information which is common through the entire disc such as the disc title and the name of the singer also is repeatedly recorded. By this arrangement, a proper display can be made even when playback is made from a midway point of the music program. Even if a reading error has occurred temporarily, a correct display can be made if correct information is reproduced thereafter. Since data is received always during performance of the music program, total amount of data satisfies all needs without waste. Besides, editing by means of the editing information increases data efficiency with a result that the amount of instantaneous data transmission can be held at the minimum.

In the case of FIG. 3 in which the data is constructed of the basic characters only, the basic character block follows the initial control block. The control block in FIG. 3 becomes TBN=0100 (constructed of one line, 4 blocks)

CC=00 0000 (constructed only of basic blocks)

BTCN=10 0000 (the basic character line is constructed of 32 characters) p1 OTCN=0 0000 (no optional characters).

When one line is set at 15 blocks (the maximum value of TBN is 1111) with only the basic characters, data is constructed of 8 characters (i.e., the number of characters of one block)×15 blocks=120 characters.

In FIG. 4 in which the optional characters are recorded also, the initial control block is followed alternately by the basic character block and the optional character block. The control block in FIG. 4 becomes TBN=0110 (constructed of one line, 6 blocks)

CC=00 0001 (optional characters are recorded)

BTCN=01 1000 (the basic character line is constructed of 24 characters)

OTCN=0 1100 (the optional character line is constructed of 12 characters).

As to TBN in the control block, there may be a case where it is more convenient to count the number of the basic character blocks and the number of the optional character blocks separately.

By recording always the basic characters also in recording the optional characters as in FIG. 4, alphabetic characters and figures can at least be displayed in a low-cost display device which cannot display the optional characters. In a case where the optional characters can be displayed, it will be more convenient if the user can switch the manner of display to either or both of the two types of display.

When one line is set at 15 blocks (the maximum value of TBN is "1111"), the optional characters-such as Chinese characters which consist of 16 bits can be recorded up to 4 characters×15 blocks=60 characters.

The display speed in the cases of FIGS. 3 and 4, for example, becomes as follows:

```
Speed of reproduction
    of subcoding block:    75 blocks/sec.
Rate of appearance of the Q-channel subcoding
    of Mode 5:             5/100
Number of the character
    codes:                 4 characters/block (Chinese characters)
                           8 characters/block (alphabetic characters
                               and figures)
Number of characters which
    can be recorded:       75 × 5/100 × 4 = 15
                               characters/sec. (Chinese characters)
                           75 × 5/100 × 8 = 30
                               characters/sec. (alphabetic
                               characters and figures)
Amount of characters which can be displayed
    (written twice):       15/2 = 7.5 characters/sec.
                               (Chinese characters)
                           30/2 = 15 characters/sec.
                               (alphabetic characters and figures)
```

Reproduction of one line data made at this display speed will take some time before completion so that there arises a problem that it will take some time from start of reproduction of a music program till display of the contents of the music program. This problem can be solved if the data transmission rate is made higher but this will require an extremely large transmission capacity and therefore is not practicable. In the present embodiment, an arrangement is made so that character code information and data of music program number (TNO) of a next music program are recorded in the Q-channel subcoding of Mode 5 at a position before the heading position of the next music program starts (i.e., before the preceding music program ends) and the character code information of the next music program is already reproduced and stored before the next music program starts. By this arrangement, the stored data is displayed when TNO of Mode 1 has coincided with TNO of Mode 5 whereby data of a low data transmission rate can be displayed at a high data transmission rate in appearance.

An error check during reproduction is made by employing a CRC check code (FIG. 2c). Additionally, whether or not the same data is obtained twice is detected and correct data only is displayed. By effecting such double check, occurrence of an abnormal display can be prevented.

The Q-channel subcoding data can be recorded in package in a lead-in area of a Compact Disc as well as in the music program. This enables all contents of a music program to be displayed immediately upon loading of the Compact Disc in the Compact Disc player. If the lead-in area is too narrow to have all data recorded, minimum necessary data such as the title of music program of each music program number can be recorded in the lead-in area.

Description will now be made about a case where display by the above described character code information of Mode 5 is modified. For effecting modification of a character, an escape sequence is inserted in character code information of the Q-channel subcoding and modification information for performing modification of a character is recorded in the escape sequence.

Figure 5:
FIG. 5 is a diagram showing a general form of an escape sequence used for modifying character code information.
Figure 6A:
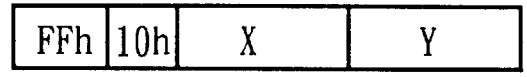
FIGS. 6a to 6f are diagrams showing a specific example of the escape sequence used for modifying character code information.
Figure 6B:
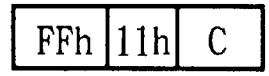
Figure 6C:
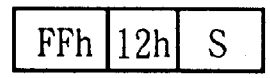
Figure 6D:
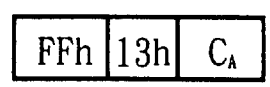
Figure 6E:
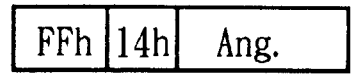
Figure 6F:
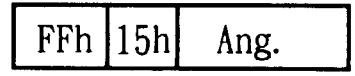

A general form of an escape sequence for performing modification of a character recorded in the Q-channel subcoding is shown in FIG. 5. The modification information in this escape sequence can also be written twice as the information shown in FIGS. 3 and 4.

In character code information in the Q-channel subcoding, an escape sequence is inserted at a position before the character code information to which modification should be instructed. The escape sequence starts with an escape (ESC) code FFh (h represents a hexadecimal number) to be followed by a type code and attribute parameter which indicates specific contents. The type code represents a type of modification of a character.

A specific example of escape sequence for modification of a character will be described with reference to FIGS. 6a to 6f.

(a) Display Position (type code: 10h)

This designates a display position on the display unit by co-ordinates X and Y. When the display position is provided, one character only of the following character code is displayed at the display position X, Y.

(b) Displayed color (type code: 11)

This designates a displayed color of a character. When this is provided, the following character code is displayed with the designated color until a next different displayed color is designated (in the following designation of (c) to (f) also, the same modificatin is continued until the designation is changed). A color code C is defined, for example, in the following manner:

C=00h: red
01h: blue
02h: green (c) Character Size (type code: 12h)

This designates the character size of a displayed character. A character size code S is defined, for example, in the following manner:

S=0h: normal
01h: small
02h: large (d) Character Decoration (type code: 13h)

This designates decoration of a character. A character decoration code CA is defined, for example, in the following manner:

CA=0h: normal
01h: bold
02h: italics
04h: underline
08h: in white
0Fh: with shade (e) Character Angle (type code: 14h)

Figure 7A:
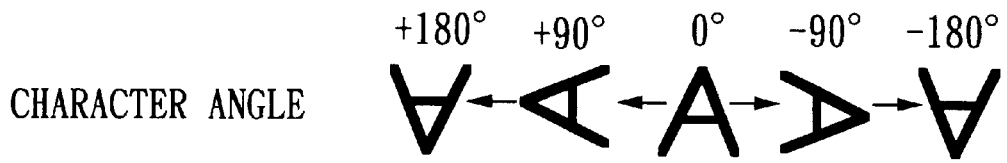
FIGS. 7a and 7b are diagrams for explaining the meaning of the angle of character and the angle of character trains shown in FIGS. 6e and 6f.

This designates an angle of display of a displayed character in Ang. (plus or minus 180 degrees). This character angle means an angle of a character itself as shown in FIG. 7a.

(f) Character Train Angle (type code: 15h)

Figure 7B:
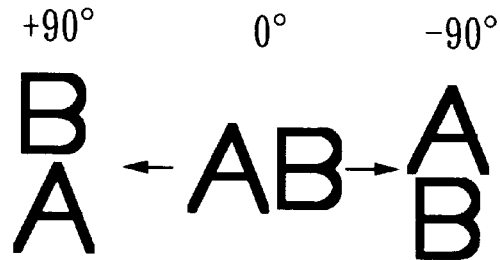

This designates an angle of a character train in Ang. (plus or minus 180 degrees). This character train angle means the direction of disposition of a character train as shown in FIG. 7b.

Different types of character modifications can also be applied to one character. When different types of character modifications should be changed simultaneously, escape sequences of different types are provided before the character code. By defining a certain code, e.g., FEh, as a special code designating that all types of modifications should be restored to "normal" (code: 00h), it becomes unnecessary to provide a train of designations for restoring all types of modifications to normal individually when the state without modification should be brought about and, accordingly, amount of necessary data can be saved.

Figure 8:
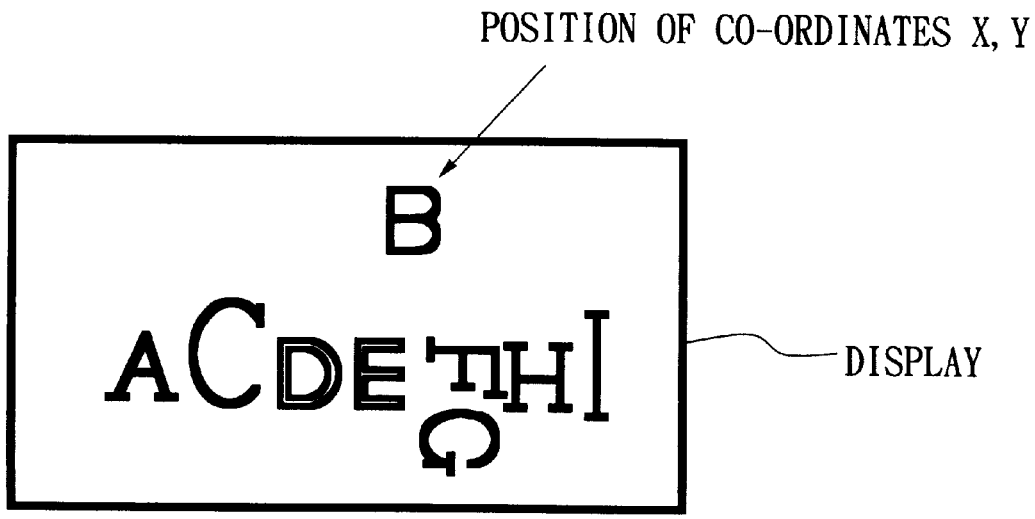
FIG. 8 is a diagram showing an example of display in a display unit based on the definitions of FIG. 6.
Figure 9:
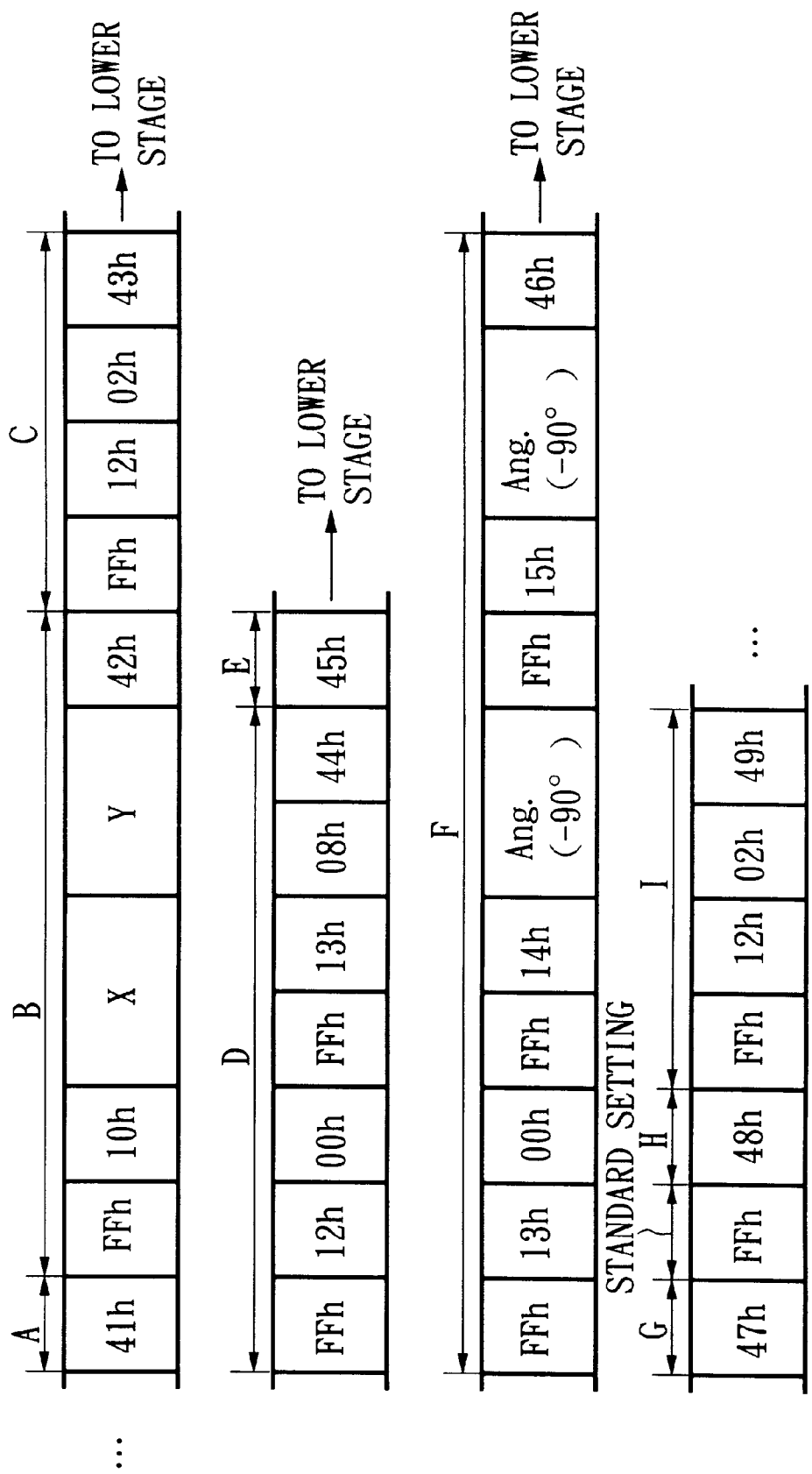
FIG. 9 is a diagram showing a series of data of Q-channel subcoding in Mode 5 for expressing the display of FIG. 8.

A specific example of display based on the above definitions is shown in FIG. 8. Series of data of subcoding in Mode 5 for realizing this display is shown in FIG. 9.

Next, an embodiment of the Compact Disc player incorporating the invention will be described.

Figure 10A:
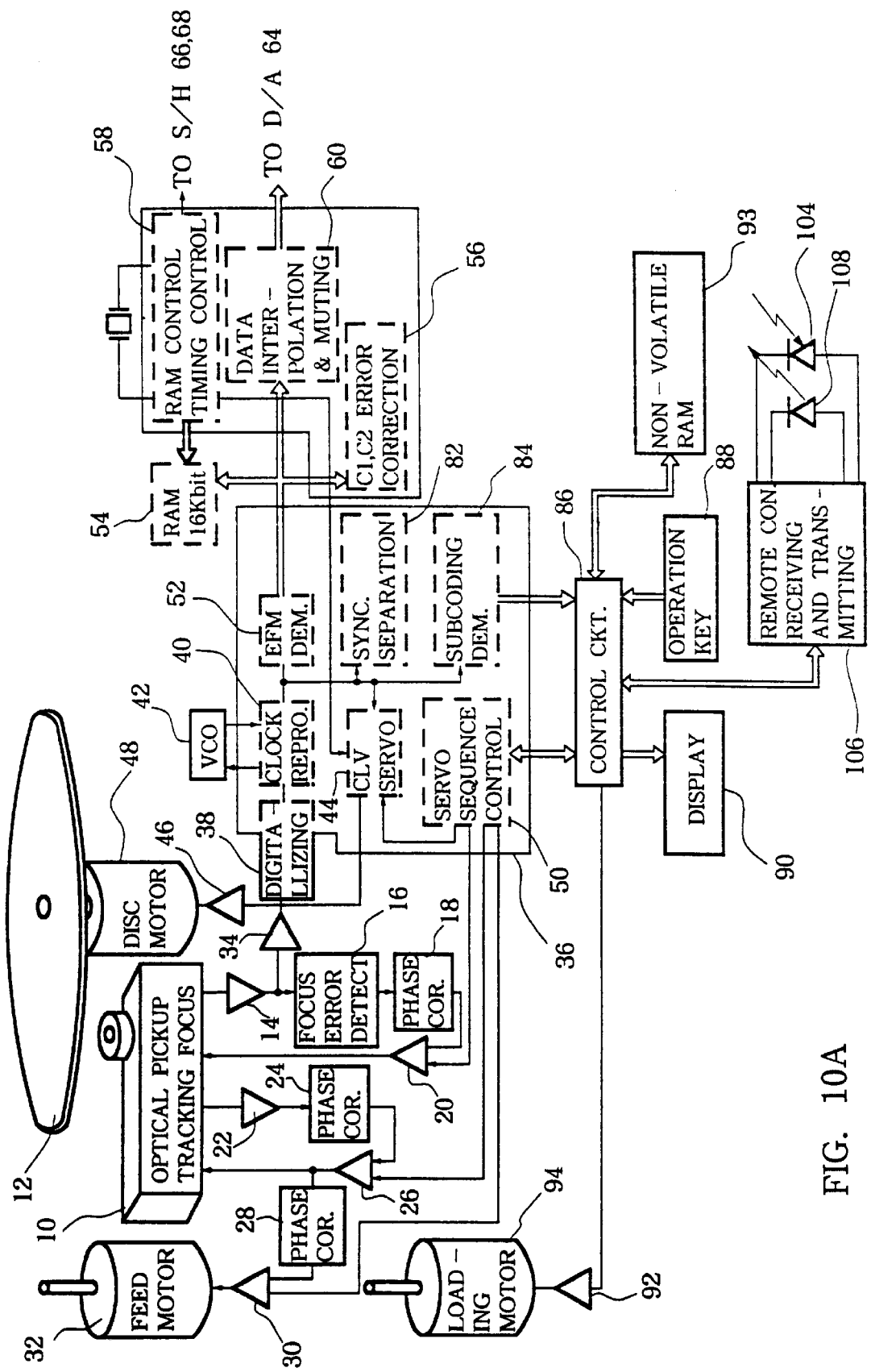
FIGS. 10A to 10C are block diagrams showing the entire construction of a Compact Disc player of this embodiment.
Figure 10B:
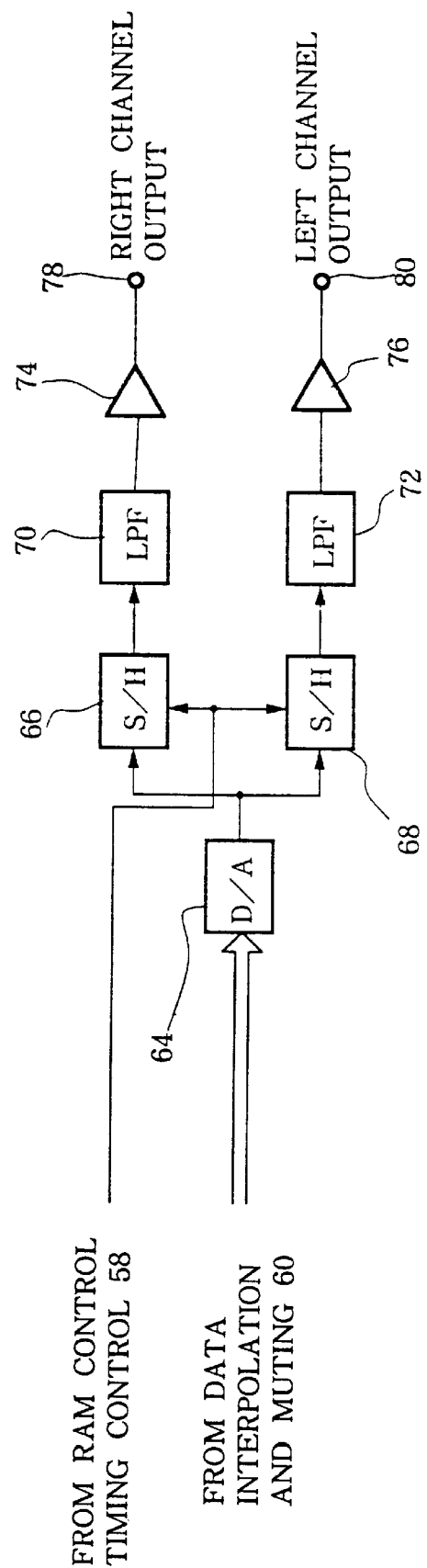
Figure 10C:
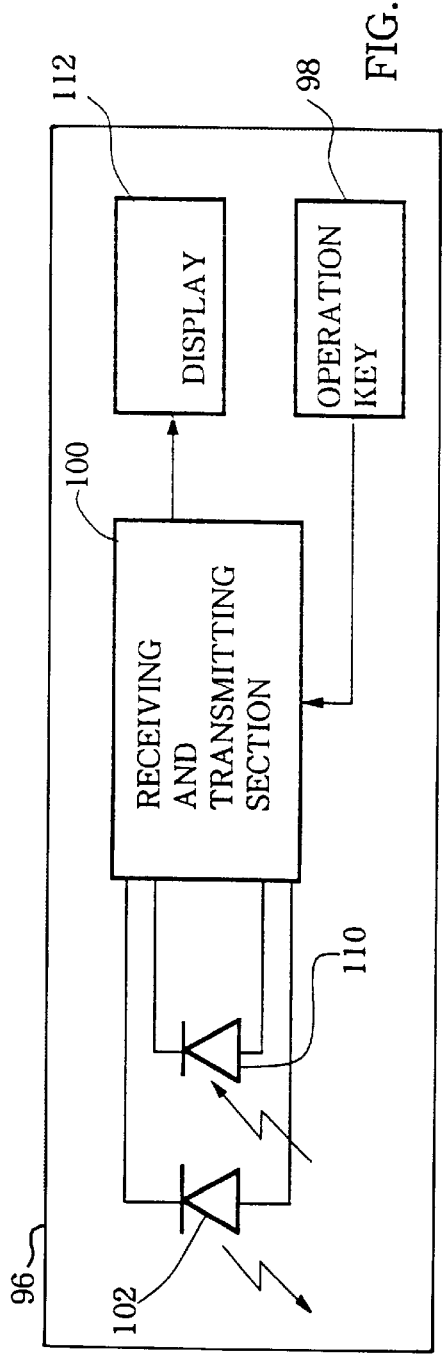

FIGS. 10A to 10C shows an entire construction of the Compact Disc player incorporating the invention.

In FIGS. 10A to 10C, an optical pickup 10 irradiates a laser beam on a Compact Disc (hereinafter referred to as "disc") 12 and receives a reflected beam therefrom. A received beam signal is applied to a focus error detection circuit 16 through a preamplifier 14 and a focus error is detected by the circuit 16. The focus error signal is supplied to a focus actuator in the optical pickup 10 through a phase correction circuit 18 and a drive amplifier 20 and a focus adjusting control is made by a focus servo. A tracking error signal is supplied to a tracking actuator in the optical pickup 10 through a preamplifier 22, a phase correction circuit 24 and drive amplifier 26 whereby a tracking control is made by a tracking servo.

The tracking error signal from the drive amplifier 26 is also supplied to a feed motor 32 through a phase correction circuit 28 and a drive amplifier 30 and a feed control is made by a feed servo.

A record signal (HF signal) which has been detected by the optical pickup is applied to a digital IC 36 through an HF amplifier 34. In the digital IC 36, the HF signal is rectified in wave by a digitallizing circuit 3 for enabling subsequent digital processing and thereafter is compared by a clock reproduction circuit 4 with a reference frequency from a VCO 42. Output of the circuit 4 which represents result of comparison is supplied to a disc motor 48 through a CLV servo circuit 44 and a drive amplifier 46 for controlling the disc motor 48 and thereby controlling the disc 12 at a constant linear velocity.

A servo sequence controller 5 sequence-controls the focus servo, tracking servo, feed servo and disc rotation servo.

A signal reproduced from the disc 12 (hereinafter referred to as "reproduced signal") is EFM-demodulated by an EFM demodulation circuit 52 and thereafter is stored once in a RAM 54. C1 and C2 error correction of the reproduced signal is made by an error correction circuit 56 and thereafter data of the reproduced signal is read out sequentially at an accurate period by a RAM control timing control circuit 58. The read out data is subjected to data interpolation and data muting, if necessary, by a data interpolation and muting circuit 60. The output of the circuit 60 is converted to an analog signal by a digital-to-analog converter 64 and thereafter is distributed to left and right channels by sample and hold circuits 66 and 68. The left and right channel signals are supplied to output terminals 7 and 80 through low-pass filters 70 and 72 and amplifiers 74 and 76.

A synchronizing signal separation circuit 82 separates a synchronizing signal from the reproduced signal and a subcoding demodulation circuit 84 demodulates a subcoding from the reproduced signal.

A conrtol circuit 86 controls the respective circuits in accordance with operations of an operation key 88 and a remote controller 96 (shown in FIG. 5c) by a user and causes a display 90 to display information based on the demodulated subcoding. The control circuit 86 also causes a loading motor 94 through a drive amplifier 92 to drive to control loading of a disc tray (not shown).

The remote controller 96 in this embodiment constitutes a bidirectional remote controller with the Compact Disc player. The remote controller 96 includes an operation key 98 and outputs a command signal prepared by operating the operation key 98 from a remote controller receiving and transmitting section 100 and transmits the command signal from an infrared projection section 102. The Compact Disc player has an infrared receiving section 104 which receives the infrared signal from the remote controller 96 and supplies the received signal to the control circuit 86 through a remote controller receiving and transmitting section 106 for implementation of the commanded function.

Display information reproduced by the Compact Disc player is supplied to the remote controller receiving and transmitting section 106 and transmitted from the infrared projection section 108. This infrared signal is received by an infrared receiving section 110 of the remote controller 96 and displayed on a display 112 through the remote controller receiving and transmitting section 100.

A non-volatile RAM 93 stores display information based on the Q-channel subcoding of Mode 1 and Mode 5 reproduced from the disc 12. The display information is read from the non-volatile RAM 93 by operation of the operation key 88 of the Compact Disc player or the operation key 98 of the remote controller 96 and utilized for various purposes including retrieval and display of the reproduced position on the disc 12.

Figure 1:
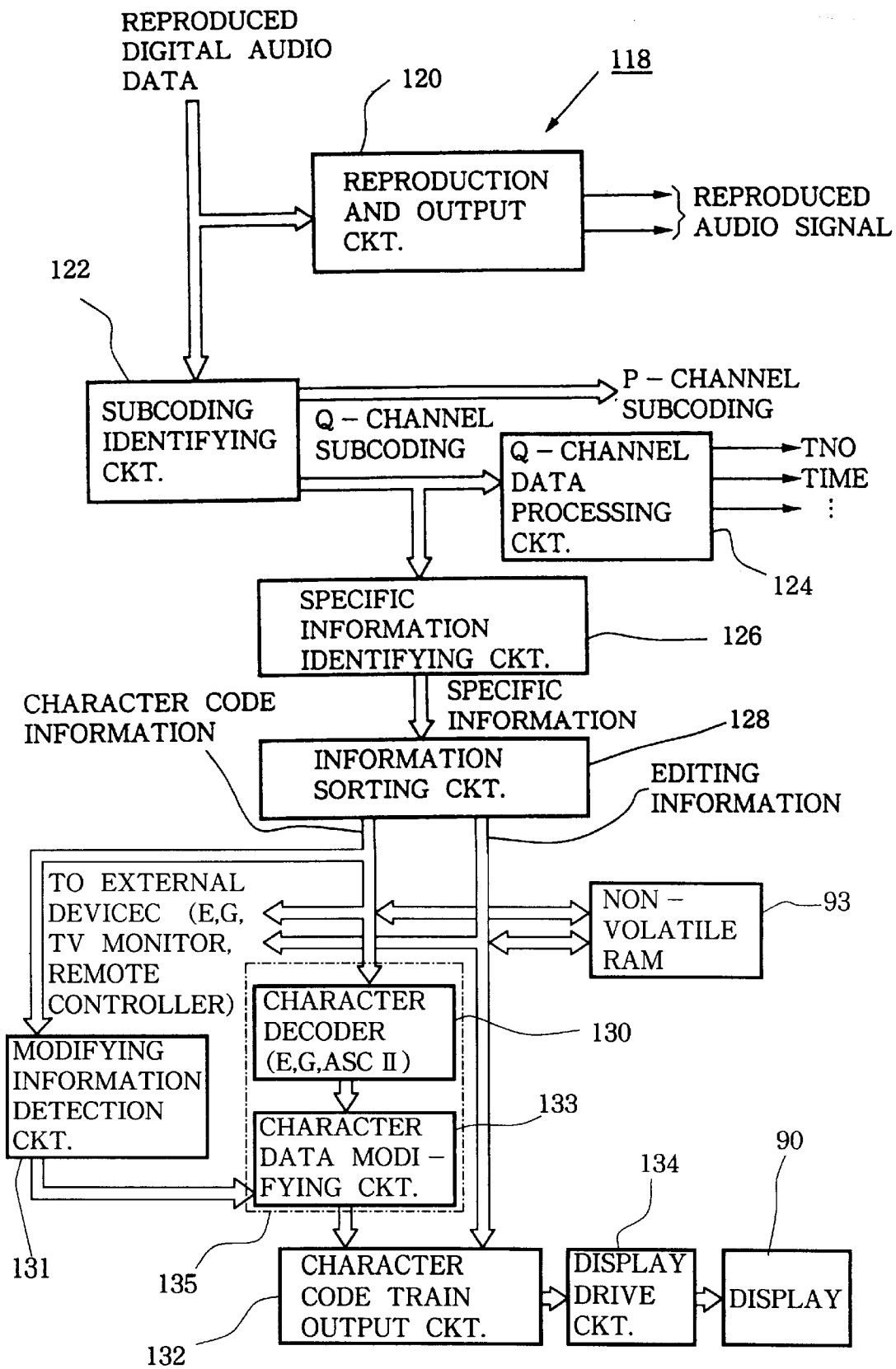
FIG. 1 is a block diagram showing an embodiment of the Compact Disc player according to the invention.

An embodiment of the display device of the invention incorporated in the above described Compact Disc player is shown in FIG. 1. The functions of this display device can be performed by the circuits such as the digital IC 36 and the control circuit 86 shown in FIG. 10A.

In a character display circuit 118, digital audio data reproduced from a Compact Disc is demodulated to an audio signal by a reproduction and output circuit 120 (corresponding to a portion including the EFM demodulation circuit 52 and subsequent circuits in FIG. 10). Subcodings in the digital audio data are detected by a subcoding identifying circuit 122 (corresponding to the subcoding demodulation circuit 84 and related circuits in FIG. 10) and identified as a P-channel subcoding, Q-channel subcoding etc.

A Q-channel data processing circuit 124 obtains music program number information TNO and time information TIME by demodulating the Q-channel subcoding of Modes 1 to 3 and displays these information at predetermined positions in a display (display 90 or a display which is provided separately from the display 90).

A specific information identifying circuit 126 identifies the Q-channel subcoding of Mode 5 which is used in the present invention by the identifying information (ADR= 0101, see FIG. 2c) and outputs this subcoding.

An information sorting circuit 12 sorts the Q-channel subcoding of Mode 5 into character code information (i.e., basic character block data and optional character block data) and editing information (control block data) by identifying the DC code therein (FIGS. 2d to 2f). These information are stored in the non-volatile RAM 93. These information are also provided for enabling display in an external device such as a television monitor.

In the character information, the optional character information in this embodiment consists of JIS Chinese character code and the basic character information consists of ASCII code. These information are decoded by a character code decoder 130 to display data of the character patterns corresponding to the respective codes.

A modifying information detection circuit 131 detects character modifying information from escape code FFh inserted in the character code information. A character data modifying circuit 133 converts display data of a character pattern provided by the character code decoder 130 to display data applied with a character modification according to the modifying information detected by the modifying information detection circuit 131. This character modification is made only once with respect to a display position and is made continuously with respect to other types of modifications until contents of modification are changed for the same type of modification.

A character code train output circuit 132 edits the decoded display data by identifying the editing information as a character code train which can be displayed by a display. This character code train data is supplied to the display 90 through a display drive circuit 134 so that display of information concerning contents of the music program is made. The display 90 is constructed of a suitable display such as a line display using a dot display, e.g., an LCD (liquid crystal display) or LED (light emitting diode). Display of information according to the invention can be made basically by any display that can make display of at least one line. Depending upon the grade of the Compact Disc player, display in plural lines can also be made. It is also possible to make display by providing a small television monitor using liquid crystal in the Compact Disc player.

An example of a character display operation by the character display circuit 118 of FIG. 1 will now be described. In a normal playback condition, an audio signal is reproduced from the disc 12 by the reproduction and output circuit 120. In parallel with this, the P-channel subcoding and the Q-channel subcoding are identified by the subcoding channel identifying circuit 122. The Q-channel subcoding of Mode 1 is demodulated by the Q-channel data processing circuit 124 to the music program information and time information and the demodulated information is displayed by the display 90 or the display which is provided separately from the display 90.

The Q-channel subcoding of Mode 5 is identified by the specific information identifying circuit 126 and sorted into the character code information and editing information by the information sorting circuit 128. The character code information is decoded by the character code decoder 130. The modifying information in the character code data is detected by the modifying information detection circuit 131. The character data modifying circuit 133 applies character modification designated by this modifying information to the decoded character code data and then outputs the modified data. The modified character display data is arranged by the character code train output circuit 132 to a character code train corresponding to the editing information and is displayed by the display 90 through the display drive circuit 134.

The demodulated character code information and editing information are stored in the non-volatile RAM 93. As described previously, the same character code is repeatedly recorded in the Q-channel subcoding of Mode 5 during reproduction of the same music program and the first character code information read from the disc is stored in the RAM 93 and ncessary character code is read from the stored code information of the RAM 93 and displayed thereafter as long as the same music program continues. As to the secondly occurring data, only important data such as the title of the performed music program may be read and displayed once again and this title may be continuously displayed thereafter. This is because it may irritate the user to display different data again and again during performance of the same music program. When the music program has changed and contents of the character code have therefore changed, the new character code is stored in the RAM 93 and displayed. The character code of the preceding music program also is left in the RAM 93 and is utilized for subsequent display and retrieval of a music program.

As described previously, there are various contents of display which are specified by the SC code. These contents of display are displayed directly in the order of reproduction (if the capacity of the display 90 is small, new contents are displayed after old contents have been erased) or, alternatively, displayed by designating the SC code or the contents of display by operation of the operation key 88 or 98. If there is no particular designation, the disc title and the title of music program only (or the title of music program only) may be displayed automatically. In a case where the optional characters are recorded, it will be convenient if either one or both of the basic character and the optional character is displayed by a key operation by the user.

Upon completion of reproduction of data from the disc 12, all character information about the disc 12 is stored in the RAM 93 and this storage is left in the RAM 93 even after the disc 12 is detached from the Compact Disc player. The stored information is used for retrieval of a music program next time the same disc 12 is played back. Since the character code information of the disc 12 has already been stored in the RAM 93, more storing of the same character information is not made this time. For preventing overflowing of the RAM 93, it will be convenient if data which has become unnecessary is erased from the RAM 93 by a key operation by the user.

For storing character code information in the RAM 93, for example, character code information having various different contents may be stored in package for each music program with a classifying code (SC) imparted to each music program (i.e., character code information is stored for each music program). Alternatively, the various character code information for all music programs may be stored in package for each classifying code (SC) (i.e., character code information is stored for each classifying code). Information of the music program number (TNO) and classifying code (SC) may be expressed by an address at which the information is stored.

In the case of playing back a Compact Disc for which the character code information has already been stored in the RAM 93, the stored information can be effectively utilized. For utilizing this information, for example, the disc title (SC=0000) is automatically reproduced to detect whether the same disc title has already been stored or not. If the disc title has already been stored, a title of a music program corresponding to designation of the music program number (TNO) of the music program is read from the RAM 93 and displayed in accordance with the designation by a key operation by the user. Since the modifying information is simultaneously read out at this time, modification of a character is performed. In the case of reproducing and displaying the character code information by detecting the location of the information on the disc, it usually takes some time before the title of the music program is displayed due to the low rate in transmission of the information. By displaying the character code information on the basis of the stored information in the RAM 93, the title of the music program can be displayed instantly upon designation by the key operation. Thus, once the disc title of the loaded disc has been identified, a display corresponding to designation can be made instantly by designating the music program number or classifying code by a key operation (or by designating it by operation of a special key provided for each particular contents of display).

As a specific method for reading the character code information from the RAM 93, in a case where various information is stored in package for each music program, music program information is selected by designtion of a music program number corresponding to the music program and information which is imparted with the designated classifying code is read from among the character code information included in this music program information. In a case where various information is stored for each classifying code, character code information of the designated classifying code is selected and the information corresponding to the designated music program number TNO is read from among this character code information.

In the above described embodiment, description has been made about a case where six types of character modifications are applied. It should be noted that various other modifications are possible.

In the above described embodiment, the character modification has been applied to the character code information of the Q-channel subcoding of Mode 5. The character modification can also be applied to character code information of the Q-channel subcoding of Mode 1 or character code information of other channels including R to W channels.

In the above described embodiment, the modifying information is inserted in the character code train in the Q-subcoding of Mode 5. Alternatively, the modifying information may be recorded in other subcodings including R to W channels.

Another embodiment of the invention will now be described.

Description will be made about a case where character code information and image information according to this embodiment are mixedly displayed. Briefly described, according to this embodiment, character code information and editing information are recorded in an unused mode of the Q-channel subcoding of a Compact Disc format and image information is recorded in R to W channel subcodings of the Compact Disc format. Image control information is recorded in the character code information. In a Compact Disc player, the character code information is edited as a character code train by using editing information read from a Compact Disc and image information is obtained in response to image editing information. The character code and image information are combined together and displayed by a display unit. In a case where the display by the image information according to the invention is mixed with the display by the character code information, there arises the great advantage that the size of the image can be varied in accordance with the size of a character font used. Alternatively stated, in a case where a special character is displayed by using image data, the size of the image displayed can be changed in accordance with the size of the character so that the displayed image will be displayed as one character of a train of characters.

It is desirable from the standpoint of design to display a character and an image designed in conformity with the character at the same ratio of size. Besides, a character and an image are generally designed having regard to the balance in size between them. These requirements can be easily satisfied by applying this invention. It is therefore quite advantageous for improving the quality of display to have a function of changing the size of an image in accordance with the size of the character in a display unit capable of changing the size of a character.

The data format of character code information which does not include image information is the same as the one which has already been described with reference to FIGS. 2–4.

Nextly, an example of a data format for performing a mixed display of character information and image information will be described. For performing such mixed display, image information is recorded in R to W-channel subcodings whereas an escape sequence is inserted in character information of the Q-channel subcoding for recording image control information used for displaying image information.

An example of an escape sequence recorded in the Q-channel subcoding and image information recorded in the R to W-channel subcodings is shown in FIGS. 12a and 12b. In FIGS. 12a and 12b, each data is shown as being written only once but it may be written twice as in data of FIGS. 3 and 4.

In the character code information in the Q-channel, an escape sequence is inserted at a location where image information is to be displayed. If all of one line is displayed with image information, the entire one line becomes the escape sequence. The escape sequence starts with an escape (ESC) code FFh (h signifies a hexadecimal notation) indicating start of the escape sequence and a type code follows it. The type code represents the type of image display and has the following contents:

| | |
|---|---|
| Type 0 (00h): | Inserted image in character code information. Display position is the same position as recorded position. |
| Type 1 (01h): | Inserted image in character code information. The inserted position is designated. |
| Type 2 (02h): | Inserted image in character code information. Attribute information for image is designated. |
| Type 3 (03h): | Inserted image in character code information. The inserted position and attribute information for image are designated. |

The inserted images of the types 0 and 2 are displayed as a part of a character train and a subsequent character train is displayed immediately after the image.

The inserted images of the types 1 and 3 are displayed at designated positions regardless of a character train and do not affect the display position of a subsequent character train.

The escape sequence of FIG. 12a show a data format of the type in which address information of image information is recorded immediately after the type code 00h. This address information designates image information to be displayed in this escape sequence and consists of several bytes (e.g., 4 bytes). As this address information, for example, an offset amount (FIG. 12b) counted in bytes or image unit from the head of all image information recorded in the R to W-channel subcodings of a single Compact Disc to a position at which desired image information is recorded can be used.

Following the address information, code information of a substituting character train is recorded. This substituting character train is provided for displaying character information in place of image information in a Compact Disc player whose display capacity is too low to display image information. As the substituting character train, for example, character information corresponding to contents of display by image information is recorded. By this arrangement, at least contents which are to be displayed by image information can be displayed by character information in a Compact Disc player which cannot display image information so that allowance of display capacity of a Compact Disc player can be enlarged.

After the substituting character train, an escape sequence end code FEh is recorded and the escape sequence is thereby completed and the data format returns to character code information.

Figure 13:
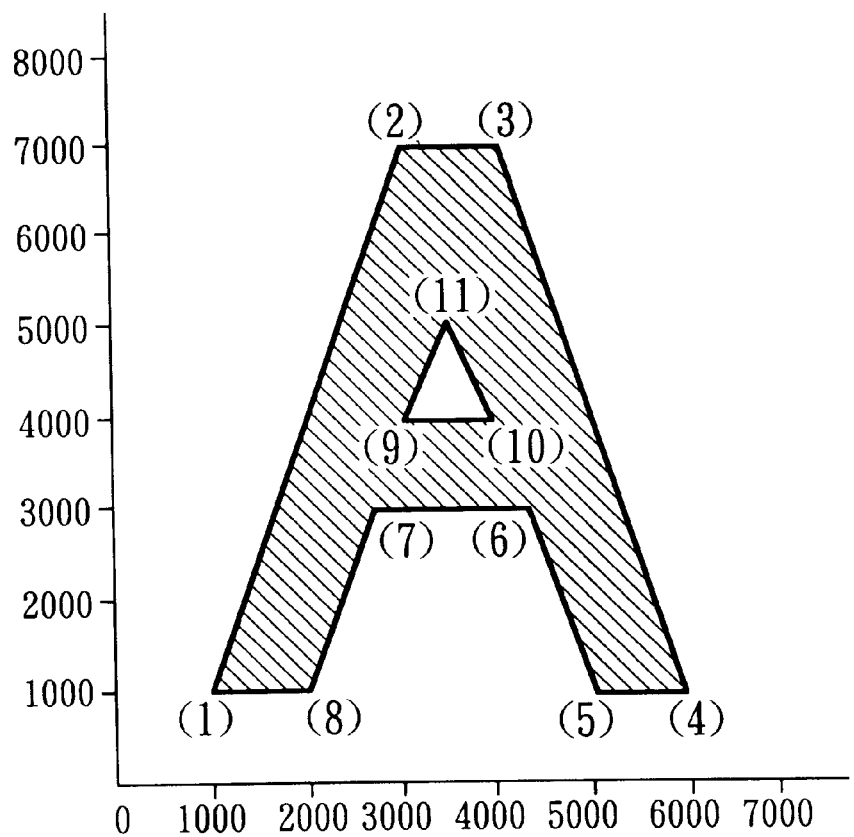
FIG. 13 is a diagram showing an example of image defined by the image contour co-ordinates data of FIG. 5b.

On the other hand, image information according to the invention is recorded on R to W channel subcodings. The image information is made in the form of image contour data consisting of a train of co-ordinate points of an image contour. As shown in FIG. 12b, the image information starts with, for example, FFhh00h representing start of one image contour co-ordinates data (FFhxxh in R to W channels is defined in a different meaning from FFhxxh in Q-channel), followed by FFh01h representing start of one closed area and then by a train of data representing co-ordinate points of respective flexing points of the closed area. The data (1) to (11) of the co-ordinate points shown in FIG. 12b represent co-ordinates data of the respective flexing points (1) to (10) of an image "A" shown in FIG. 13. As data of co-ordinate points, data of a sufficiently large value should be used for improving the accuracy of the image displayed. The end of the closed area defined by the co-ordinate points (9) to (11) defining the other closed area follow. The end of this closed area is designated by FFh02h. When all co-ordinate points of the closed areas have been shown, the end of one image contour co-ordinates data is designated by FFh10h and the following numeral "50" designates application of a grey pattern of 50% to a space defined between the two closed areas (shown in shade in FIG. 14). One image contour data is constructed in the above described manner. This data can be written twice. The Compact Disc player displays the read image contour information after enlarging or reducing it to a size mathcing with the display unit. In this case, adjacent co-ordinate points are automatically interpolated (by linear, spline or other interpolation) to produce and display bit mat data. Thus, an image of a high quality can be always obtained regardless of the size of the display unit.

Since image information is read from a Compact Disc, stored in a RAM and read from the RAM for display by address information of image information in the escape sequence, the record position of the escape sequence in the Q-channel need not be the same position as the record position of the image information in the R to W-channels. By recording, however, image information to be displayed by the escape sequence at a playback position before the position at which the escape sequence is recorded, when an escape sequence has been read in a case where a Compact Disc is played back for the first time, image information designated by this escape sequence has already been stored in a RAM, so that image information can be displayed in real time. In a case where image information to be displayed by an escape sequence is recorded at a playback position after the position at which the escape sequence is recorded and the image information to be displayed by the escape sequence has not been stored in the RAM yet when the escape sequence has been read, display may be made by using substituting character information in place of the image information. In this case also, all image information is stored in the RAM once the Compact Disc has been played back so that image information can be displayed in real time in the second and subsequent playback.

As the address of image information, an offset amount from the head of all image information in playing back a Compact Disc from the beginning counted, for example, in bytes may be used and this address information is given to image information read from the Compact Disc and stored in the RAM. Alternatively, address information may be imparted previously to each image information and recorded in the R to W-channel subcodings. By the latter arrangement, image information can be stored with address information even when a Compact Disc is played back from a midway for the first time.

Figure 14A:

Examples of display in a case where the image information of FIG. 12b is designated by the address information of the Q-channel of FIG. 12a is shown in FIGS. 14a and 14b. FIG. 14a shows an example of display made by a Compact Disc player capable of displaying image information. In this example, the image of "A" shown in FIG. 13 which is represented by the image contour co-ordinates data of FIG. 12b is displayed between the character display of "ABC" and "HI" in a size matching the size of the display used. Since the image of "A" is produced on the basis of the image contour co-ordinates data, an image of a high quality can be always obtained even if the size of the image is enlarged or reduced in accordance with the size of the display unit.

FIG. 14b shows an example of display made in a Compact Disc player which cannot display image information. In this example, the substituting character "A" of FIG. 12a is displayed in place of image information. By recording these substituting characters corresponding to desired image information as substituting contents, these substituting characters enable the user to know at least the contents written by the image information.

In a case where image information can be displayed, it may be made possible to select which of the displays of FIGS. 14a and 14b should be made by a key operation or other method.

The above description has been made with respect to image display of the type 0. Formats of escape sequences of the types 1 to 3 are shown in FIGS. 15 to 17. In FIGS. 15 and 17, X and Y are information designating display position in a display. In FIGS. 16 and 17, ATR represents attribute information for character code information and image information. As attribute information ATR, for example, a color code which designates color of a character or an image, information representing size of a character, modification of a character, angle of a character and angle of a character train and information concerning a logical operation such as inversion, exclusive OR, OR and AND are recorded. As a conceivable logical operation, there will be a case, for example, where an image read from a Compact Disc is superposed upon a currently displayed image and operations in corresponding bits of these images become necessary. Assume that, for example, a display in black and white is made and that:

---

$d(x,y)$ represents value of pixel at a display position $(x,y)$,
$i(x,y)$ represents value of pixel of an image which is to be displayed,
$D(x,y)$ represents value of pixel after display, and
$L(\ )$ represents logical operation.
The pixel value $D(x,y)$ becomes
$D(x,y) = L(d(x,y) * i(x,y))$ where $D(x,y)$, $d(x,y)$

--- and $i(x,y)$ are 0 or 1 ("*" represents logical operation such as IMP, XOR, OR, AND). In the case of a color display, similar logical operation is made for each corresponding R.G.B. (Red, Green, Blue) bit in each pixel.

In the data format of Q-channel, the above described types 0 to 3 can be recorded mixedly. In practical application, the type used is determined depending upon the degree of fucntion of a Compact Disc player designed. In terms of function, the type 3 only will suffice.

Figure 18:
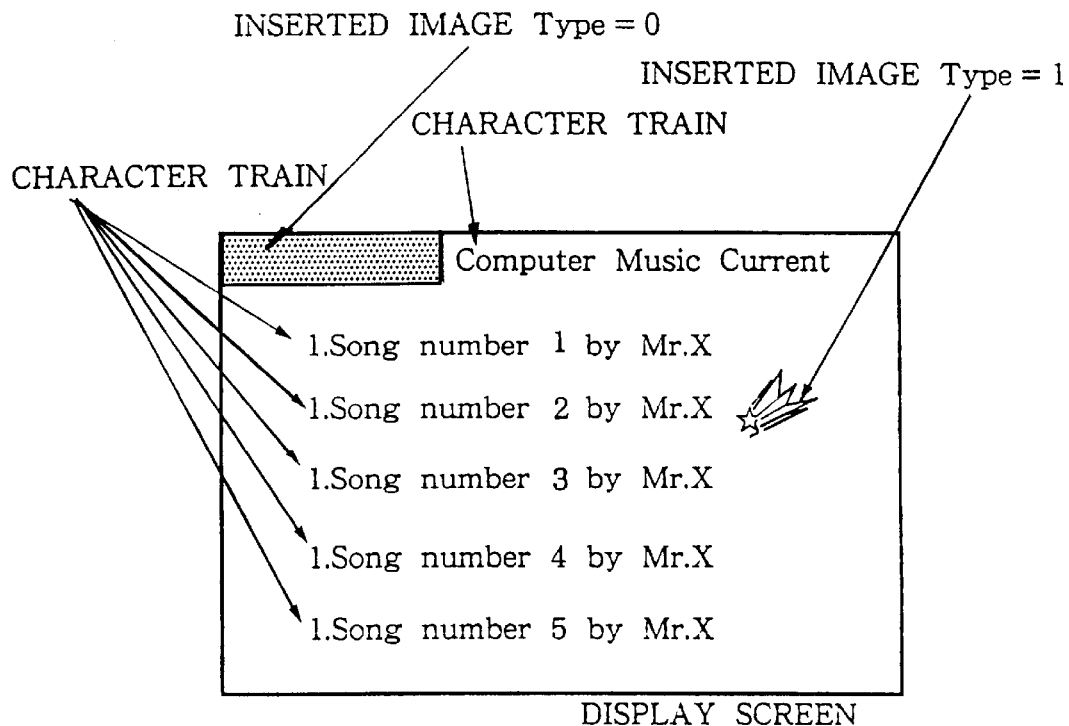
FIG. 18 is a diagram showing an example of mixed display of character information and image information.
Figure 19:
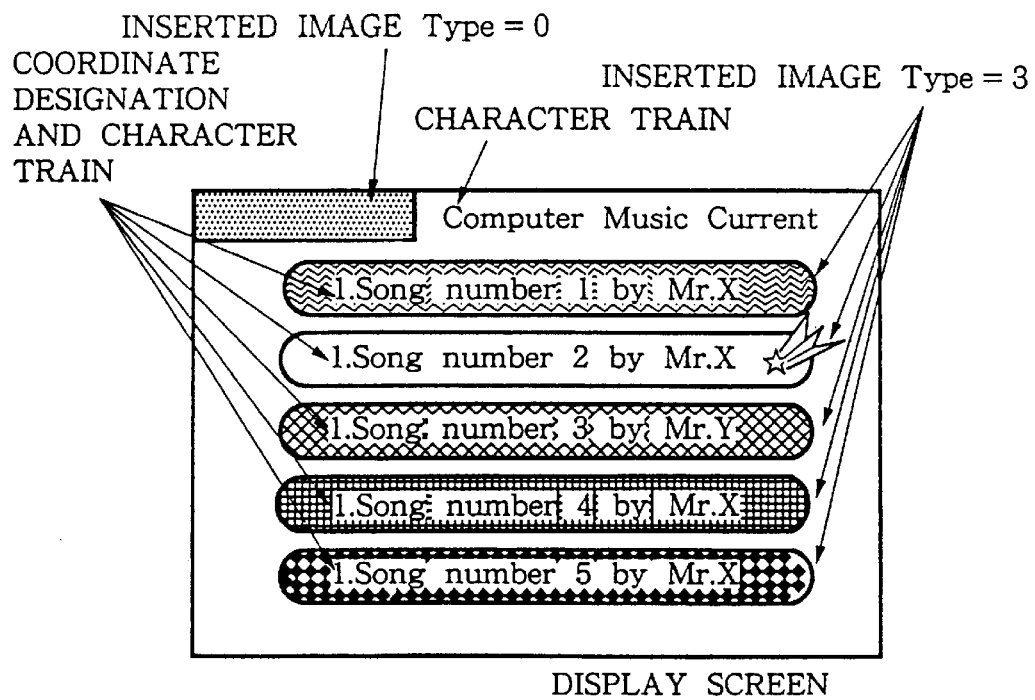
FIG. 19 is a diagram showing another example of mixed display of character information and image information.

Specific examples of mixed display of character code information and image information are shown in FIGS. 18 and 19. In FIG. 18, all music programs, names of performers and the disc title are displayed by character code information. In a portion of the disc title, an inserted image of the type is displayed. In a Compact Disc player which cannot display an image, substituting character information corresponding to this inserted image is displayed in the position of the image information. Further, a mark to be affixed to a music program (e.g., a design of an image of the music) is displayed by an image of the type 1 in which the display position can be designated.

In FIG. 19, a frame with a color or a pattern is displayed as an inserted image of the type 3 at display position of each music program. Modification of characters by attribute information is also made in this example. In the foregoing manner, a versatile expression which is equal to a design of a Compact Disc jacket can be realized.

An embodiment of the Compact Disc player accoridng to the invention performing a mixed display of character and image information will be described.

Figure 20A:
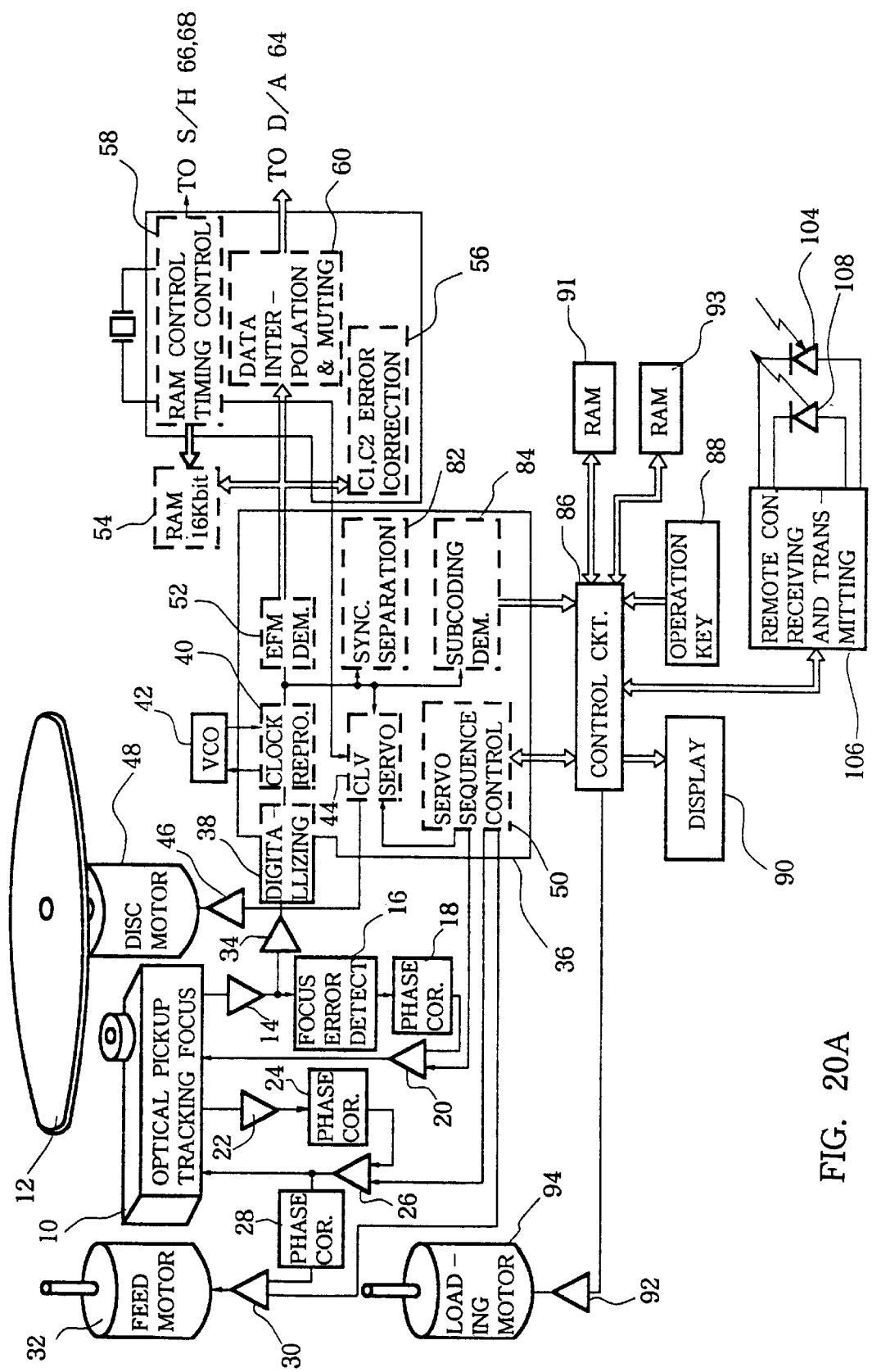
FIGS. 20A to 20C are block diagrams showing the entire construction of a Compact Disc player of this embodiment.
Figure 20B:
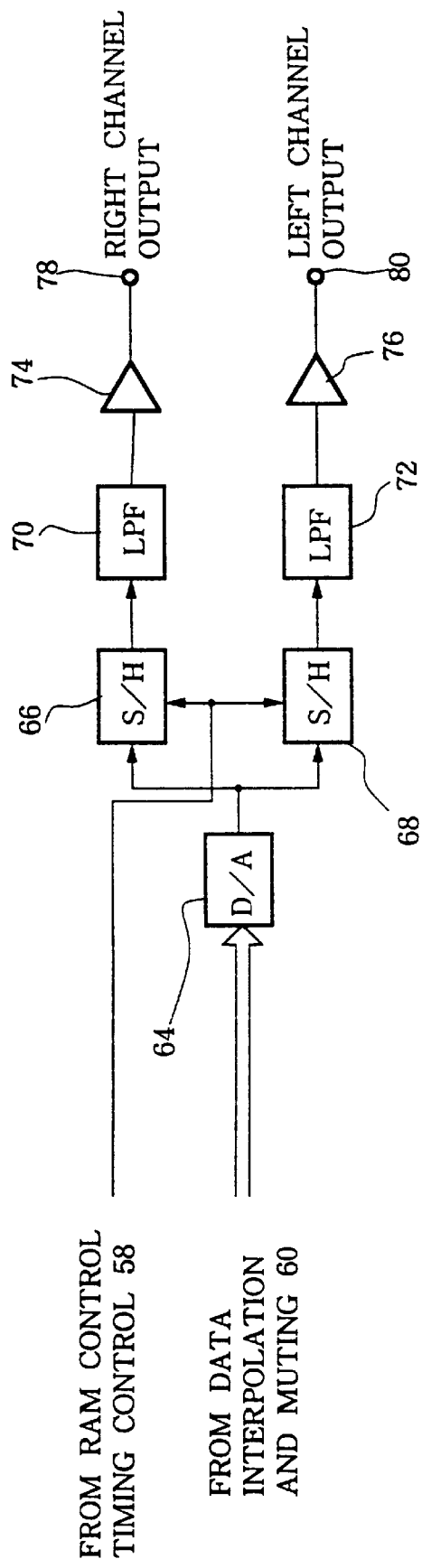
Figure 20C:
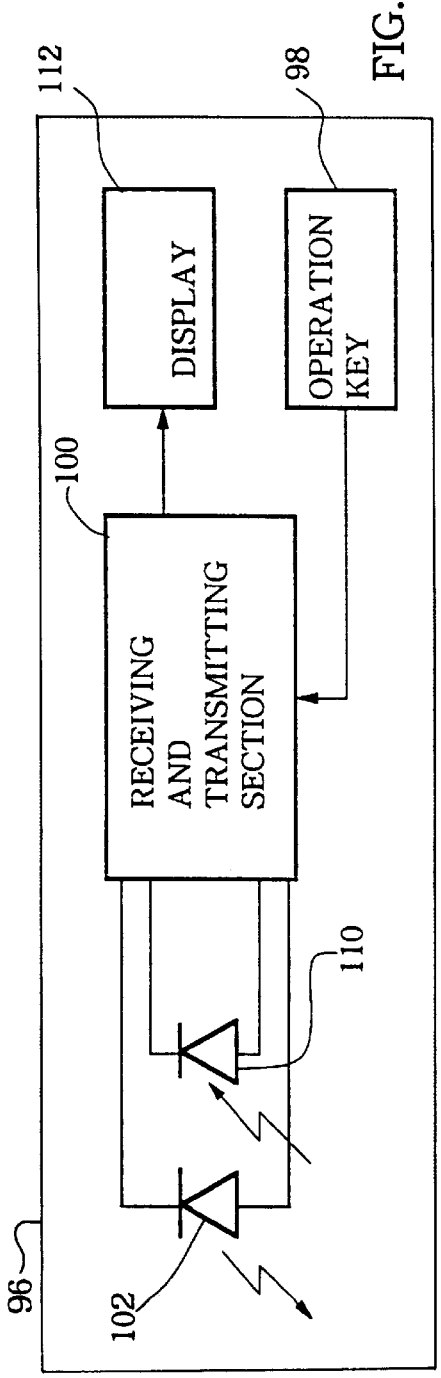

FIGS. 20A to 20C show an entire contruction of the Compact Disc player to which the application is applied. The construction of FIGS. 20A to 20C is basically the same as the construction of FIGS. 10A to 10C.

In FIG. 20, an optical pickup 10 irradiates a laser beam on a Compact Disc (hereinafter referred to as "disc") 12 and receives a reflected beam therefrom. A received beam signal is applied to a focus error detection circuit 16 through a preamplifier 14 and a focus error is detected by the circuit 16. The focus error signal is supplied to a focus actuator in the optical pickup 10 through a phase correction circuit 18 and a drive amplifier 20 and a focus adjusting control is made by a focus servo. A tracking error signal is supplied to a tracking actuator in the optical pickup 10 through a preamplifier 22, a phase correction circuit 24 and drive amplifier 26 whereby a tracking control is made by a tracking servo.

The tracking error signal from the drive amplifier 26 is also supplied to a feed motor 32 through a phase correction circuit 28 and a drive amplifier 30 and a feed control is made by a feed servo.

A record signal (HF signal) which has been detected by the optical pickup is applied to a digital IC 36 through an HF amplifier 34. In the digital IC 36, the HF signal is rectified in wave by a digitallizing circuit 38 for enabling subsequent digital processing and thereafter is compared by a clock reproduction circuit 40 with a reference frequency from a VCO 42. Output of the circuit 40 which represents result of comparison is supplied to a disc motor 48 through a CLV servo circuit 44 and a drive amplifier 46 for controlling the disc motor 48 and thereby controlling the disc 12 at a constant linear velocity.

A servo sequence controller 50 sequence-controls the focus servo, tracking servo, feed servo and disc rotation servo.

A signal reproduced from the disc 12 (hereinafter referred to as "reproduced signal") is EFM-demodulated by an EFM demodulation circuit 52 and thereafter is stored once in a RAM 54. C1, C2 error correction of the reproduced signal is made by an error correction circuit 56 and thereafter data of the reproduced signal is read out sequentially at an accurate period by a RAM control timing control circuit 58. The read out data is subjected to data interpolation and data muting, if necessary, by a data interpolation and muting circuit 60. The output of the circuit 60 is converted to an analog signal by a digital-to-analog converter 64 and thereafter is distributed to left and right channels by sample and hold circuits 66 and 68. The left and right channel signals are supplied to output terminals 78 and 80 through low-pass filters 70 and 72 and amplifiers 74 and 76.

A synchronizing signal separation circuit 82 separates a synchronizing signal from the reproduced signal and a subcoding demodulation circuit 84 demodulates a subcoding from the reproduced signal.

A conrtol circuit 86 controls the respective circuits in accordance with operations of an operation key 88 and a remote controller 96 (shown in FIG. 5c) by a user and displays information based on the demodulated subcoding on a display 90. The control circuit 86 also drives a loading motor 94 through a drive amplifier 92 to control loading of a disc tray (not shown).

The remote controller 96 in this embodiment constitutes a bidirectional remote controller with the Compact Disc player. The remote controller 96 includes an operation key 98 and outputs a command signal prepared by operating the operation key 98 from a remote controller receiving and transmitting section 100 and transmits the command signal from an infrared projection section 102. The Compact Disc player has an infrared receiving section 104 which receives the infrared signal from the remote controller 96 and supplies the received signal to the control circuit 86 through a remote controller receiving and transmitting section 106 for implementation of the commanded function.

Display information reproduced by the Compact Disc player is supplied to the remote controller receiving and transmitting section 106 and transmitted from the infrared projection section 108. This infrared signal is received by an infrared receiving section 110 of the remote controller 96 and displayed on a display 112 through the remote controller receiving and transmitting section 100.

The non-volatile RAM 93 is a RAM for storing mainly characters. The RAM 93 stores character code information of the Q-channel subcoding of Mode 1 and Mode 5 and information of escape sequence reproduced from the disc 12. The display information is read from the non-volatile RAM 93 by operation of the operation key 88 of the Compact Disc player or the operation key 98 of the remote controller 96 and utilized for various purposes including retrieval and display of the reproduced position on the disc 12.

The RAM 91 is a RAM for storing image and stores image information (image contour co-ordinates data) by the R–W channel subcoding reproduced from the Compact Disc 12 with address information. The RAM 91 is constructed of a non-volatile RAM.

Figure 11:
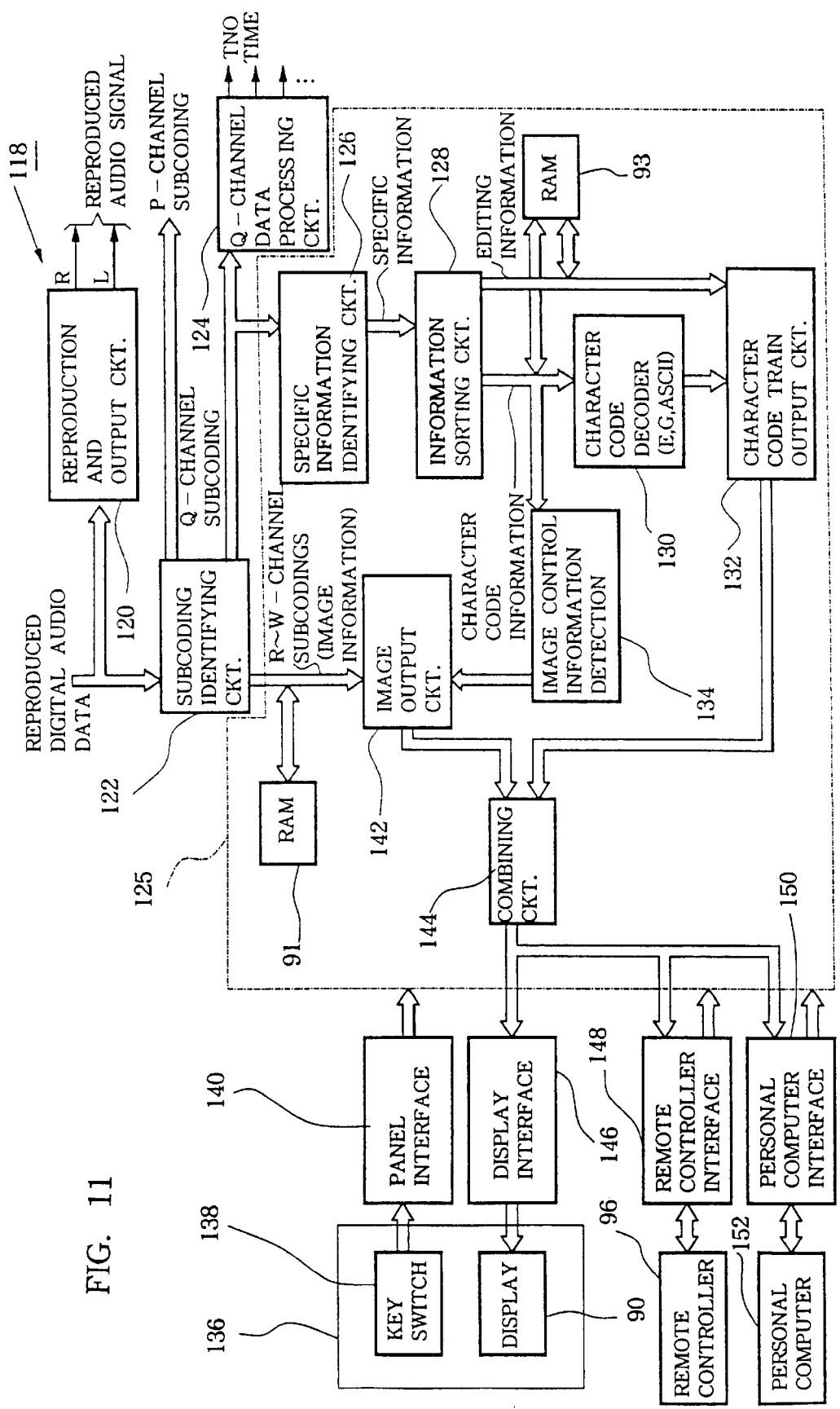
FIG. 11 is a block diagram showing another embodiment of the invention.

An embodiment of the display device according to the invention housed in the reproduction main body is shown in FIG. 11. The function of this display device is realized by a digital IC 36 and a control circuit 86 in FIG. 20.

In a display device 118, digital audio data reproduced from a Compact Disc is supplied to a reproduction and output circuit 120 (corresponding to the EFM demodulation circuit 52 and subsequent circuits in FIG. 20) in which an audio signal is demodulated. The digital audio data is also supplied to a subcoding channel identifying circuit 122 (corresponding to the subcoding demodulation circuit 84 of FIG. 20) where subcodings are detected and classified into P-channel subcoding, Q-channel subcoding and R to W-channel subcodings.

A Q-channel data processing circuit 124 demodulates the Q-channel subcoding of Modes 1 to 3 and thereby obtains music program number TNO and time information TIME to cause these information to be displayed at predetermined position in a display (display 90 or a separate display).

In a control unit 125 functioning also as a character-image decoder, specific information identifying circuit 126 identifies the Q-channel subcoding of Mode 5 by means of identifying information (ADR=0101, see FIG. 2c) and outputs this data.

An information soritng circuit 12 sorts the Q-channel subcoding of Mode 5 into character code information (basic character block data and optional character block data) and editing information (control block data) by means of a DC code (FIGS. 2d to 2f). The character code information includes an escape sequence information. These information are stored in a non-volatile RAM 93.

The control unit 125 functioning also as the character-image decoder receives designated operation information produced by operation of a key switch 138 in a front panel 136 (e.g., display of all music program titles or display of contents of music program which is currently played back) and provides corresponding character code information and editing information from the non-volatle RAM 93.

The optional character information in the character code information is constructed of a suitable optional character (Chinese characters in this embodiment) and the basic character information is constructed of ASCII code. The character code information is decoded by a character code decoder 130 to display data of a character pattern corresponding to the character code. A character code train output circuit 132 edits the decoded display data to an externally displayable character code train and outputs this character code train.

The image information (i.e., image contour co-ordinate data) of the R to W-channel detected by the subcoding channel identifying circuit 122 is stored with the address information in the RAM 91.

An image contorl information detection circuit 134 detects, in response to an operation designating a display mode by the key switch 138 of the front panel 136, image control information included in an escape sequence identified by ESC codes FFh and FEh from among character code information which have been read from the RAM 93.

An image output circuit 142 reads out image information (i.e., image contour co-ordinates data) from an address of the RAM 91 corresponding to the address information contained in the image control information. On the basis of this image contour co-ordinates data, bit map data of a size matching with the size of the display 90 is produced. Since the bit map data is produced by interpolating the designated co-ordinate points by linear, spline or other interpolation, display of a high quality in conformity with the display ability (resolution) of the display 90 is realized regardless of the size of the display 90. Accordingly, even when the image is displayed in an enlarged scale, ruggedness of the contour is not so conspicuous as in the conventional display device. The bit mad data thus produced is delivered out after being subjected to a signal processing corresponding to the type code in the image control information.

A combining circuit 144 combines character information and image information together and outputs the combined information. The combined output is supplied to the display 90 in the front panel of the Compact Disc player through a display interface 146 in the Compact Disc player and mixed displays of character code information and image information as shown in FIGS. 18 and 19 are made. The display 90 can be constructed, for example, of an LCD, LED or small CRT. The combined output is also supplied to a remote controller 96 through a remote controller interface 14 for similar display. In a case where the display capacity of the display of the remote controller 96 is too small to perform display of image information, substituting characters are used in place of image information. The same is the case when the display capacity of the display 90 of the Compact Disc player is small.

The Compact Disc player can be connected bidirectionally to a personal computer 152 on a general data format level of a byte unit through a personal computer interface 150 such as a parallel interface (e.g., Centronics interface) and LAN (local area network). The personal computer 152 controls character code information and image information stored in the RAMs 93 and 91 by transferring and accumulating them and thereby enables control such as a search of the Compact Disc player from the personal computer 152. The personal computer 152 also displays mixed data of character code information and image information in its own display. In this case, the personal computer 152 can produce by itself bit map data of a size mathcing with a display used on the basis of the image contour co-ordinates data. Thus, by employing a personal computer of a large capacity as the personal computer 152, character code information and image information can be accumulated and controlled for a large number of Compact Discs and these information can be used for such control as displays and search of the Compact Disc player and, accordingly, operability of the disc device is improved. The disc device is particularly advantageous when it is used for a Compact Disc player having an automatic changer function for a number of Compact Discs.

An example of a character display operation by the display device 118 of FIG. 11 will be described. In a normal playback condition, an audio signal is reproduced by the reproduction and ouptut circuit 120. In parallel with this, the P-channel subcoding, Q-channel subcoding and R to W-channel subcodings are identified by the subcoding identifying circuit 122. The Q-channel subcoding of Mode 1 is demodulated by the Q-channel data processing circuit 124 to the music program number and time information and the demodulated information is displayed by the display 90 or the display which is provided separately from the display 90. Image information of the R to W-channel subcodings is stored with the address information in the RAM 91.

The Q-channel subcoding of Mode 5 is identified by the specific information identifying circuit 126 and sorted into the character code information and editing information by the information sorting circuit 128 and stored in the RAM 93. The escape sequence in the character code information is also stored as it is. Character code information read from the RAM 93 by a command of a display mode by a key operation is decoded by the character code decoder 130 and is arranged by the character code train output circuit 132 to a character code pattern corresponding to editing information.

The image control information of the escape sequence included in the character code information read from the RAM 93 is detected by the image control information detection circuit 134. The image output circuit 142 reads out image information (image contour co-ordinates data) from the address of the RAM 91 corresponding to the address information in the detected image control information, produces bit map data by interpolating the designated co-ordinate points, and outputs the image information after subjecting it to a processing corresponding to the type designated by the type code.

The character code information and the image information are combined by the combining circuit 144 and supplied to the display 90 of the Compact Disc player, the display of the remote controller 96 or the display of the personal computer 152 for display of the combined information.

As described previously, the same character code is repeatedly recorded in the Q-channel subcoding of Mode 5 during reproduction of the same music program and the first character code information is stored in the RAM 93 and ncessary character code is read from the RAM 93 and displayed thereafter as long as the same music program continues. As to the secondly occurring data, important data such as the title of the first performed music program may be read and displayed once again and this title may be continuously displayed thereafter. This is because it may irritate the user to display different data again and again during performance of the same music program. When the music program has changed and contents of the character code have therefore changed, the new character code is stored in the RAM 93 and displayed. The character code of the preceding music program also is left in the RAM 93 and is utilized for subsequent display and retrieval of a music program.

As described previously, there are various contents of display which are specified by the SC code. These contents of display are displayed directly in the order of reproduction (if the capacity of the display 90 is small, new contents are displayed after old contents have been erased) or, alternatively, displayed by designating the SC code or the contents of display by operation of the operation key 88 or 98. If there is no particular designation, the disc title and the title of music program only (or the title of music program only) may be displayed automatically. In a case where the optional characters are recorded, it will be convenient if either one or both of the basic character and the optional character is displayed by a key operation by the user. In any case, image information designated by the image control information contained in the character train to be displayed is displayed also.

Upon completion of reproduction of data from the Compact Disc, all character code information about the disc is stored in the RAM 93 and all image information is stored in the RAM 91. Accordingly, by designating display of all music programs by a display mode designation operation by a key operation or the like operation, corresponding character code information is read from the RAM 93 and, simultaneously, image information is read from the RAM 91 in response to the image control information included in the character code information, so that the combined character code information and image information are displayed as shown in FIGS. 18 and 19. This storage left in the RAMs 93 and 91 is left even after the Compact Disc is detached from the Compact Disc player and is used for retreaval of a music program next time the same disc is played back. Since the character code information and image information of the disc have already been stored in the RAMs 93 and 91, new storing of the character information is not made this time. For preventing overflowing of RAMs 93 and 91, it is convenient if data of a disc which has becomes unnecessary is deleted by key operation by the user. If the data is transferred to a personal computer 152 before deleting, it can be re-utilized.

In the case of playing back a Compact Disc for which the character code information has already been stored in the RAM 93 or the personal computer 152, the stored information can be effectively utilized. For utilizing this information, for example, the disc title (SC=0000) is automatically reproduced to detect whether the same disc title has already been stored or not. If the disc title has already been stored, a title of a music program corresponding to designation of the music program number (TNO) of the music program is read from the RAM 93 and displayed in accordance with the designation by a key operation by the user. In the case of reproducing and displaying the character code information by detecting the location of the information on the disc, it usually takes some time before the title of the music program is displayed due to the low rate in transmission of the information. By displaying the character code information on the basis of the stored information in the RAM 93, the title of the music program can be displayed instantly upon designation by the key operation. Thus, once the disc title of the loaded disc has been identified, a display corresponding to designation can be made instantly by designating the music program number or classifying code by a key operation (or by designating it by operation of a special key provided for each particular contents of display).

As a specific method for reading the character code information from the RAM 93, in a case where different information is stored in package for each music program, music program information corresponding to a music program number is selected by designtion of the music program number and information which is imparted with the designated classifying code is read from among the character code information included in this music program information.

In the above described embodiment, description has been made about a case where a mixed display of character code information and image information is made. The invention is applicable also to a case where image information only is displayed.

The image display control according to the invention can be made without depending upon the Q-channel subcoding information. For example, the image control information may be recorded with image information on R to W channels.

The present invention can be applied not only to a Compact Disc but also to CVD (Compact Disc-Video), CD-I (Compact Disc—Interactive) and other discs of Compact Disc standard and playback devices playing back such discs.

What is claimed is:

1. A Compact Disc player capable of displaying character information comprising:

reproducing means for reading out digital data recorded on a compact disc, the digital data including digital audio data and specific information;

specific information identifying means for identifying specific information from digital data read out by said reproducing means, the specific information having character code information and character modifying information, the character modifying information being included in an escape sequence of a Q-channel information;

the specific information identifying means comprising converting means for converting the character code information into character information, and modifying means for modifying character information converted by said converting means on the basis of the character modifying information; and display means for displaying character information modified by said character modifying means.

2. A Compact Disc player as defined in claim 1 further comprising audio signal reproducing means for identifying digital audio data from digital data read out by said reading means and generating an audio signal corresponding to the identified digital audio data.

3. A Compact Disc player as defined in claim 1 wherein said character code information comprises basic character code information.

4. A Compact Disc player as defined in claim 3 wherein said basic character code information consists of ASCII character code information.

5. A Compact Disc player as defined in claim 3 wherein said character code information further comprises optional character code information.

6. A Compact Disc player as defined in claim 1, wherein said escape sequence is provided only when it is necessary to modify character information.

7. A Compact Disc player as defined in claim 6 further comprising audio signal reproducing means for identifying digital audio data from digital data read out by said reading means and generating an audio signal corresponding to the identified digital audio signal.

8. A Compact Disc player as defined in claim 6 wherein said character code information comprises basic character code information.

9. A Compact Disc player as defined in claim 8 wherein said basic character code information consists of ASCII character code information.

10. A Compact Disc player as defined in claim 8 wherein said character code information further comprises optional character code information.

11. A Compact Disc player capable of displaying image information comprising:

image data reproducing means for reading out image contour co-ordinates data recorded in a subcoding region of a Compact Disc, the image contour coordinates data being for forming a contour of desired image information;

image information producing means for producing variable bit map data on the basis of image contour co-ordinates data from said image data reproducing means; and display means for displaying variable image information corresponding to bit map data produced by said image information producing means.

12. A Compact Disc player as defined in claim 11 further comprising:

reproducing means for reading out digital audio data recorded on a compact disc; and audio signal generating means for generating an audio signal corresponding to digital audio data read out by said reproducing means.

13. A Compact Disc player as defined in claim 11 further comprising:

reading means for respectively reading out digital audio data and specific information recorded on a Compact Disc; and specific information identifying means for identifying specific information from digital data read out by said recorded data reproducing means, the specific information having character code information and character modifying information, said specific information identifying means comprising converting means for converting the character code information into character information, and character modifying means for modifying character information converted by said converting means in accordance with the character modifying information; and said display means for displaying the image information and character information modified by said character modifying means.

14. A Compact Disc player as defined in claim 11 further comprising:

reading means for respectively reading out digital audio data and specific information recorded on a compact disc;

audio signal generating means for identifying digital audio data from digital data read out by said recorded data reproducing means and generating an audio signal corresponding to the identified digital audio data;

specific information identifying means for identifying specific information from digital data read out by said recorded data reproducing means, the specific information having character code information and character modifying information, said specific information identifying means comprising converting means for converting the character code information into character information, and character modifying means for modifying character information converted by said converted means in accordance with the character modifying information; and said display means for displaying the image information and character information from said modifying means concurrent with generation of the audio signal by said audio signal generation means.

15. A Compact Disc player as defined in claims 11 wherein said image information consists of a train of co-ordinate points defining an image contour recorded in R to W subcodings.

16. A Compact Disc player as defined in claim 11 wherein the character modifying information is included in an escape sequence of Q-channel information whenever it is necessary to modify character information on the basis of character code information or display image information.

17. A Compact Disc wherein character code information and character modifying information for modifying a displayed character based on the character code information are recorded in a subcoding Q-channel data frame of a program region.

18. A Compact Disc as defined in claim 17 wherein said modifying information is included in an escape sequence of the subcoding Q-channel data frame.

19. A Compact Disc wherein variable image information in the form of image contour co-ordinates data is recorded on subcoding channels other than the Q-channel.

20. A Compact Disc as defined in claim 19 wherein the image information consists of a train of co-ordinate points defining an image contour recorded in R to W subcodings.

* * * * *